US010525974B2

(12) United States Patent
Nakada

(10) Patent No.: US 10,525,974 B2
(45) Date of Patent: Jan. 7, 2020

(54) PARKING TRAJECTORY CALCULATION APPARATUS AND PARKING TRAJECTORY CALCULATION METHOD

(71) Applicant: Hitachi Automotive Systems, Ltd., Hitachinaka-shi, Ibaraki (JP)

(72) Inventor: Yuki Nakada, Yokohama (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 91 days.

(21) Appl. No.: 15/319,954

(22) PCT Filed: Jun. 9, 2015

(86) PCT No.: PCT/JP2015/066556
§ 371 (c)(1),
(2) Date: Dec. 19, 2016

(87) PCT Pub. No.: WO2016/002444
PCT Pub. Date: Jan. 7, 2016

(65) Prior Publication Data
US 2017/0129486 A1 May 11, 2017

(30) Foreign Application Priority Data

Jun. 30, 2014 (JP) ................................ 2014-134374

(51) Int. Cl.
*B60W 30/06* (2006.01)
*B60W 10/04* (2006.01)
(Continued)

(52) U.S. Cl.
CPC ............ *B60W 30/06* (2013.01); *B60W 10/04* (2013.01); *B60W 10/20* (2013.01); *B60R 1/002* (2013.01);
(Continued)

(58) Field of Classification Search
CPC ...... B60W 30/06; B60W 10/04; B60W 10/20; B60W 2420/42; B62D 15/027;
(Continued)

(56) References Cited

U.S. PATENT DOCUMENTS 7,912,879 B2 * 3/2011 Witmer .................. G01C 21/32
707/831
2002/0005779 A1 * 1/2002 Ishii ...................... B62D 15/027
340/436
(Continued)

FOREIGN PATENT DOCUMENTS

JP 2002-240662 A 8/2002
JP 2004-25942 A 1/2004
(Continued)

OTHER PUBLICATIONS

International Search Report (PCT/ISA/210) issued in PCT Application No. PCT/JP2015/066556 dated Aug. 11, 2015 with English translation (5 pages).
(Continued)

*Primary Examiner* — Thomas E Worden
(74) *Attorney, Agent, or Firm* — Crowell & Moring LLP

(57) ABSTRACT

The present invention provides a parking trajectory calculation apparatus and a parking trajectory calculation method capable of calculating a parking trajectory from an arbitrary parking start position. An aspect of the present invention recognizes a parking space for parking a subject vehicle in a preset limited area Area1, calculates a first parking trajectory from P1 to P0 for guiding the subject vehicle from the arbitrary parking start position to the parking space by causing the subject vehicle to first move backward, calculates a second parking trajectory from P2 to P0 by causing the subject vehicle to move backward after moving forward if the first parking trajectory from P1 to P0 cannot be calculated, and ends the calculation of the parking trajectory if the second parking trajectory from P2 to P0 cannot be calculated.

10 Claims, 55 Drawing Sheets

(51) Int. Cl.
  *B60W 10/20* (2006.01)
  *B60R 1/00* (2006.01)
  *B60R 11/04* (2006.01)
  *B60R 11/00* (2006.01)
(52) U.S. Cl.
  CPC ......... *B60R 11/04* (2013.01); *B60R 2011/004* (2013.01); *B60W 2420/42* (2013.01)
(58) Field of Classification Search
  CPC ..... G06K 9/00812; B60R 1/002; B60R 11/04; B60R 2011/004
  See application file for complete search history.

(56) References Cited

U.S. PATENT DOCUMENTS

| | | | | |
|---|---|---|---|---|
| 2002/0084916 A1* | 7/2002 | Shimizu | ................ | B60Q 9/005 340/932.2 |
| 2004/0204807 A1* | 10/2004 | Kimura | ................ | B62D 15/028 701/36 |
| 2013/0124043 A1* | 5/2013 | Degenstein | ............ | B62D 15/02 701/41 |
| 2013/0151060 A1* | 6/2013 | Lee | .................... | B62D 15/0285 701/25 |
| 2014/0052336 A1* | 2/2014 | Moshchuk | ........... | B62D 5/0463 701/41 |
| 2016/0159397 A1* | 6/2016 | Baek | ..................... | B60W 30/06 701/41 |
| 2016/0272244 A1* | 9/2016 | Imai | ....................... | G08G 1/166 |
| 2017/0212511 A1* | 7/2017 | Paiva Ferreira | ....... | G06Q 10/08 |

FOREIGN PATENT DOCUMENTS

| | | |
|---|---|---|
| JP | 2004-99015 A | 4/2004 |
| JP | 2004-314708 A | 11/2004 |
| JP | 2009-298179 A | 12/2009 |
| JP | 2012-11818 A | 1/2012 |
| JP | 2012-46143 A | 3/2012 |

OTHER PUBLICATIONS

Japanese-language Written Opinion (PCT/ISA/237) issued in PCT Application No. PCT/JP2015/066556 dated Aug. 11, 2015 (5 pages).

* cited by examiner

PARKING TRAJECTORY CALCULATION APPARATUS AND PARKING TRAJECTORY CALCULATION METHOD

TECHNICAL FIELD

The present invention relates to a parking trajectory calculation apparatus and a parking trajectory calculation method.

BACKGROUND ART

A conventional parking trajectory calculation apparatus detects positions of obstacles on left and right sides of a vehicle during a forward movement for perpendicular parking, and sets a parking trajectory so as to prevent the vehicle from contacting adjacent vehicles on left and right sides of a parking end position and an obstacle on an opposite side from the parking end position during a backward movement.

CITATION LIST

Patent Literature

[PTL 1] Japanese Patent Application Public Disclosure No. 2009-298179

SUMMARY OF INVENTION

Technical Problem

However, the above-described conventional technique functions in such a manner that a driver first drives forward the vehicle and the parking trajectory is acquired as a parking trajectory starting from the backward movement after that, thereby raising a problem of being unable to support a parking trajectory including the first forward movement, ending up imposing a limitation on a parking start position.

An object of the present invention is to provide a parking trajectory calculation apparatus and a parking trajectory calculation method capable of calculating a parking trajectory from an arbitrary parking start position.

Solution to Problem

An aspect of the present invention calculates such a parking trajectory that the vehicle moves backward after moving forward when being unable to calculate a parking trajectory guiding the vehicle to a parking space through the backward movement.

DESCRIPTION OF EMBODIMENTS

Figure 1:
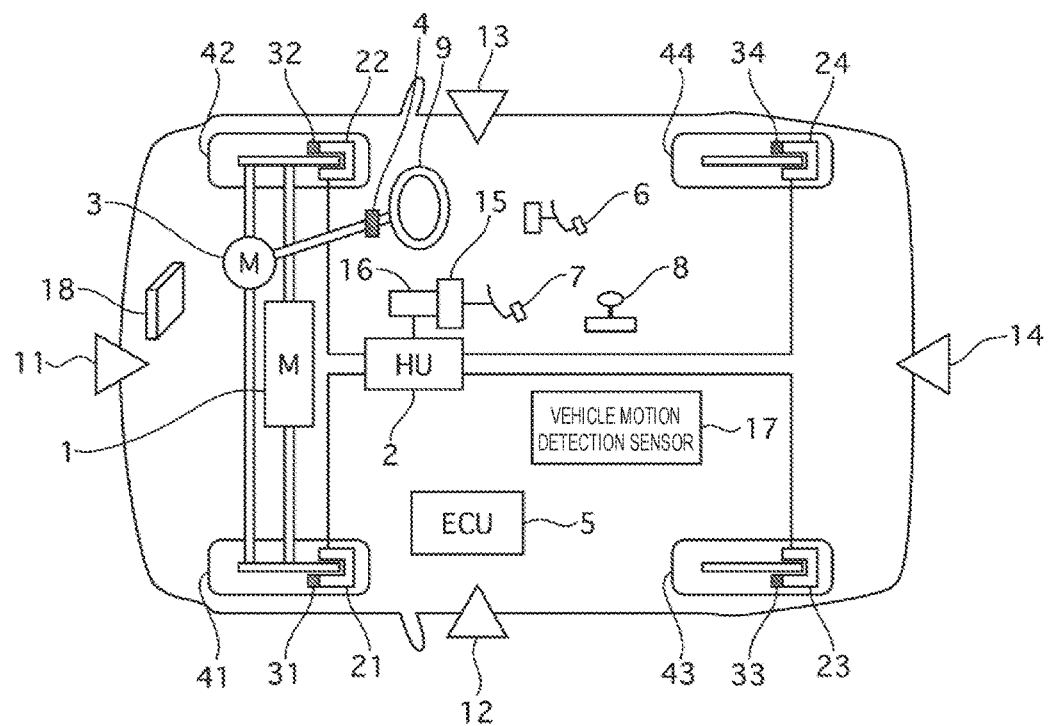
FIG. 1 illustrates a configuration of a vehicle to which a parking assist apparatus according to a first embodiment is applied.

In the following description, embodiments for embodying a parking trajectory calculation apparatus and a parking trajectory calculation method according to the present invention will be described based on exemplary embodiments illustrated in the drawings.

First Embodiment

First, a configuration will be described.

[Configuration of Vehicle]

FIG. 1 illustrates a configuration of a vehicle to which a parking assist apparatus according to a first embodiment is applied.

A driver issues an instruction for a forward movement, a backward movement, or a stop of the vehicle with a shift lever 8, and issues an instruction regarding a driving force of a driving motor 1 with an accelerator pedal 6. The driving motor 1 may be an engine. The driving motor 1 can generate the driving force and a braking force independently of a driver's operations performed on the accelerator pedal and the shift lever.

A pressing force applied to a brake pedal 7 is boosted by an electric booster 15, and a hydraulic pressure according to this force is generated in a master cylinder 16. The generated hydraulic pressure is supplied to wheel cylinders 21 to 24 via an electric hydraulic brake 2. In this manner, the driver controls the braking force with use of the brake pedal 7. The electric booster 15 can control the hydraulic pressure in the master cylinder 16 independently of the driver's operation performed on the brake pedal, and the electric hydraulic brake 2 can individually independently control braking forces of four wheels (hydraulic pressures in the wheel cylinders 21 to 24) with use of a pump, an electromagnetic valve, and the like driven by a motor built therein. The braking forces of the four wheels that are generated according to the driver's operation performed on the brake pedal are not different between a left side and a right side.

An electric power steering 3 generates an assist torque according to a steering torque input by the driver via a steering wheel 9, and front left and right wheels 41 and 42 are steered by the steering torque input by the driver and the assist torque generated by the electric power steering 3 to allow the vehicle to be turned while running. Further, the electric power steering 3 can generate the steering torque to steer the front left and right wheels 41 and 42 independently of the driver's steering operation.

Further, four cameras 11 to 14 are mounted on a front side, a left side, a right side, and a rear side of the vehicle, respectively. The four cameras 11 to 14 image a vicinity of the vehicle, and recognize an object around the vehicle. Video images captured by the four cameras 11 to 14 are combined with one another, and are displayed on a touch panel 18 as an overhead view indicating the vehicle and the vicinity thereof as viewed from above. The driver can also park the vehicle while confirming this overhead view without relying on parking assist control.

The parking assist apparatus according to the first embodiment recognizes a parking end position based on a parking frame and a position of another parked vehicle on the video image acquired from the cameras 11 to 14, and automatically controls the driving motor 1, the electric hydraulic brake 2, and the electric power steering 3 in such a manner that the vehicle reaches the recognized parking end position. It is also possible for the driver to issue an instruction indicating the parking end position with use of the touch panel 18 where the overhead view is displayed.

Further, a steering angle sensor 4 and wheel speed sensors 31 to 34 are mounted so as to control a parking trajectory. The electric hydraulic brake 2 prevents a sideslip of the vehicle and performs anti-lock brake control based on each of sensor signals from a vehicle motion detection sensor 17, which detects a longitudinal acceleration, a lateral acceleration, and a yaw rate, the steering angle sensor 4, and the wheel speed sensors 31 to 34, and the signals from the steering sensor 4 and the wheel speed sensors 31 to 34 are also used for the parking assist control.

All of the above-described electric devices are controlled by an electronic control unit 5, and all of the individual sensor signals are also input to the electronic control unit 5. The individual sensor signals also include an amount of the operation performed on the accelerator pedal, an amount of the operation performed on the brake pedal, an amount of the operation performed on the shift lever, and the steering torque, which are amounts of the operation performed by the driver. Further, the vehicle can also be configured in such a manner that the functions of the electronic control unit 5 are divided, and the electric devices are equipped with their respective electronic control units and communicate necessary information among the individual electronic control units.

[Configuration of Parking Assist Apparatus]

Figure 2:
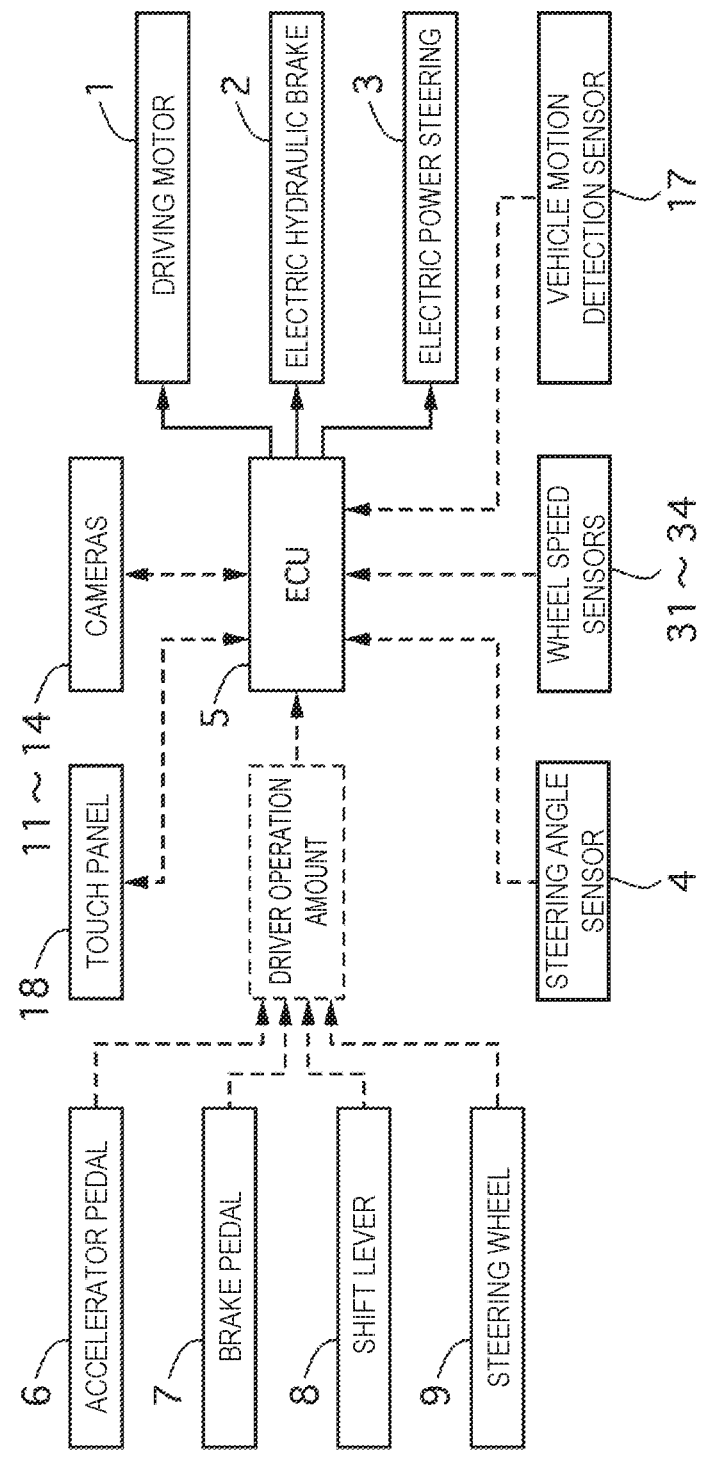
FIG. 2 illustrates a configuration of the parking assist apparatus according to the first embodiment.

FIG. 2 illustrates a configuration of the parking assist apparatus according to the first embodiment.

The motion of the vehicle is automatically controlled by the driving motor 1, the electric hydraulic brake 2, and the electric power steering 3 during a parking operation, but the amount of the operation performed by the driver is monitored so that the driver can override this control. When the driver operates the brake pedal 7, the vehicle is temporarily stopped, and the parking operation is resumed by the automatic control after the driver releases the brake. As a result, if an obstacle enters the parking trajectory, the braking operation performed by the driver is prioritized, which allows the vehicle to avoid contact with the obstacle. After that, when the operation on the brake pedal 7 is released, the parking operation is resumed by the automatic control. As a result, when the object is separated from the parking trajectory, the parking assist can be automatically resumed. Further, if the driver changes a position of the shift lever or the steering torque requested from the driver reaches or exceeds a predetermined torque, the parking operation performed by the automatic control is stopped. As a result, the vehicle can be driven while the operation on the shift lever or the steering operation performed by the driver is prioritized. An automatic control cancel button may be displayed on the touch panel 18, and the automatic control may also be canceled by pressing of this automatic control cancel button.

[Parking Assist Control]

Figure 3:
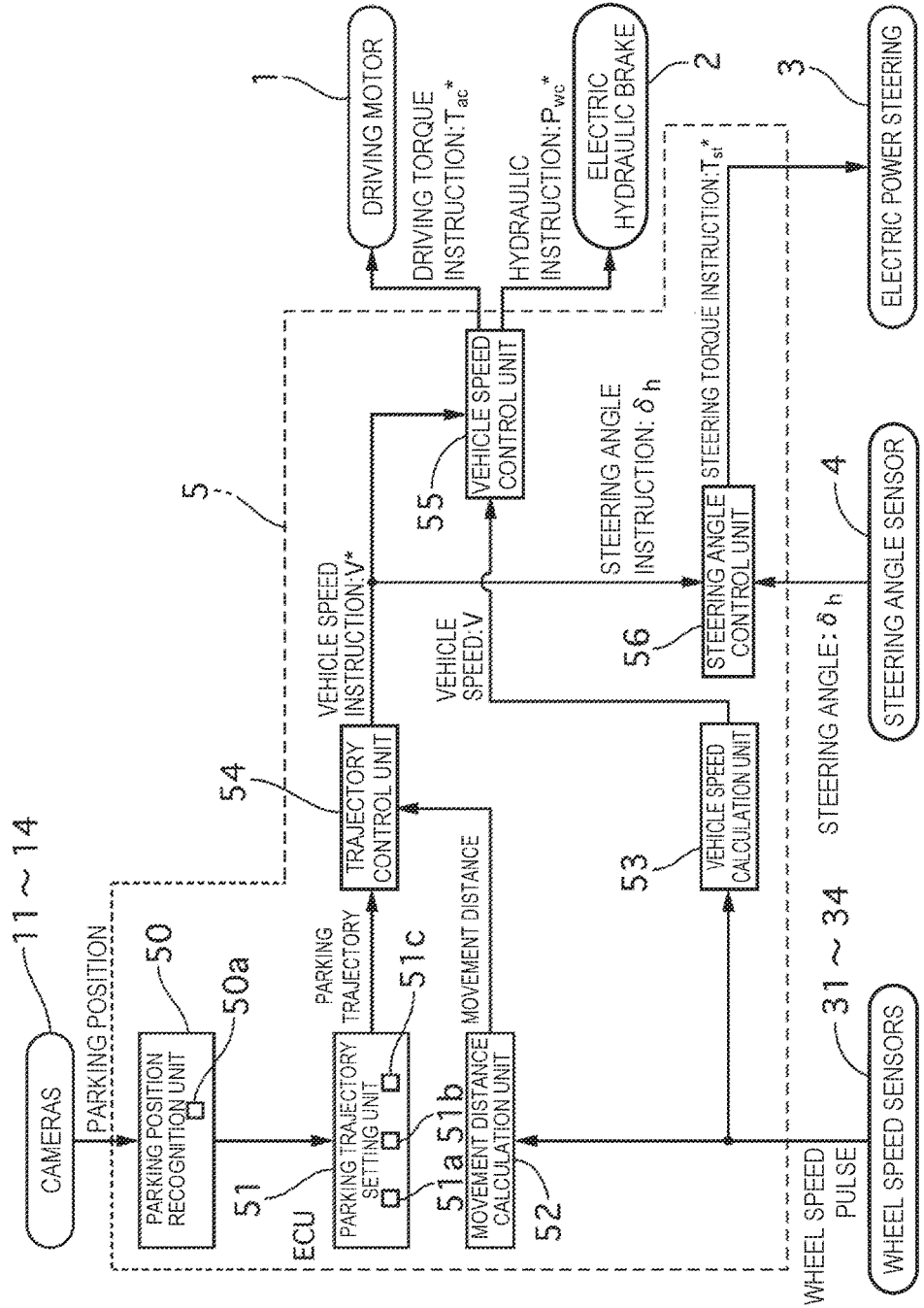
FIG. 3 illustrates a configuration of parking assist control performed by an electronic control unit 5 according to the first embodiment.

FIG. 3 illustrates a configuration of the parking assist control performed by the electronic control unit 5 according to the first embodiment.

The electronic control unit 5 includes a parking position recognition unit (a recognition unit) 50, a parking trajectory setting unit (a parking trajectory calculation unit) 51, a movement distance calculation unit 52, a vehicle speed calculation unit 53, a trajectory control unit 54, a vehicle speed control unit 55, and a steering angle control unit 56 as a configuration for realizing the parking assist control.

First, the parking position recognition unit 50 recognizes the parking end position from the video image acquired from the cameras 11 to 14 at the parking start position. The parking position recognition unit 50 includes a limited area setting unit 50*a*, which sets a limited area based on a result of recognizing the obstacle from the video image acquired from the cameras 11 to 14. The parking position recognition unit 50 recognizes a parking space, which serves as the parking end position for perpendicular parking of this subject vehicle itself in the limited area. Details of the limited area and the parking space will be described below. The parking end position may be specified by the driver via the touch panel 18 where the overhead view is displayed, as described above.

Next, the parking trajectory setting unit 51 sets the parking trajectory based on the parking end position. The parking trajectory is set only once when the parking operation is started, and is not corrected while the parking operation is ongoing. The parking trajectory is expressed as a steering angel with respect to a movement distance of the vehicle.

The wheel speed sensors 31 to 34 each generate a wheel speed pulse a plurality of times per rotation of the wheel.

The movement distance calculation unit 52 integrates the number of times that the wheel speed pulse is generated, thereby calculating the movement distance of the vehicle. Further, the vehicle speed calculation unit 53 calculates a vehicle speed V with use of a cycle per which the wheel speed pulse is generated. In the first embodiment, a movement distance and a vehicle speed at a center of a rear axle are used as the movement speed and the vehicle speed V, respectively, whereby respective average values of movement distances and wheel speeds at rear left and right wheels 43 and 44 are calculated as the movement distance and the vehicle speed V to be acquired.

The trajectory control unit 54 acquires a vehicle speed instruction V* and a steering angle instruction $\delta_h^*$ from the parking trajectory and the movement distance of the vehicle. The vehicle speed instruction V* is assumed to be constant during each of a forward movement and a backward movement.

The vehicle speed control unit 55 controls the vehicle speed based on the vehicle speed instruction V* and the vehicle speed V, and acquires a driving torque instruction $T_{ac}^*$ directed to the driving motor 1 and a hydraulic instruction $P_{wc}^*$ directed to the electric hydraulic brake 2. The driving motor 1 and the electric hydraulic brake 2 generate the driving force and the braking force according to these instructions. Both the driving force and the braking force may be generated only by the driving motor 1, or these functions may be divided in such a manner that the driving force is generated by the driving motor 1 and the braking force is generated by the electric hydraulic brake 2. In the case where the driving motor 1 is replaced with the engine, the driving force and the braking force can be generated by employing the latter method. In the first embodiment, although the driving motor 1 is used instead of the engine, the driving force is generated by the driving motor 1 while the braking force is generated by the electric hydraulic brake 2.

The steering angle control unit 56 controls the steering angle based on the steering angle instruction $\delta_h^*$ and a steering angle $\delta_h$ measured by the steering angle sensor 4, and acquires a steering torque instruction $T_{at}^*$ as the operation amount. The electric power steering 3 generates the steering torque according to this instruction.

[Control of Vehicle Speed]

Figure 4:
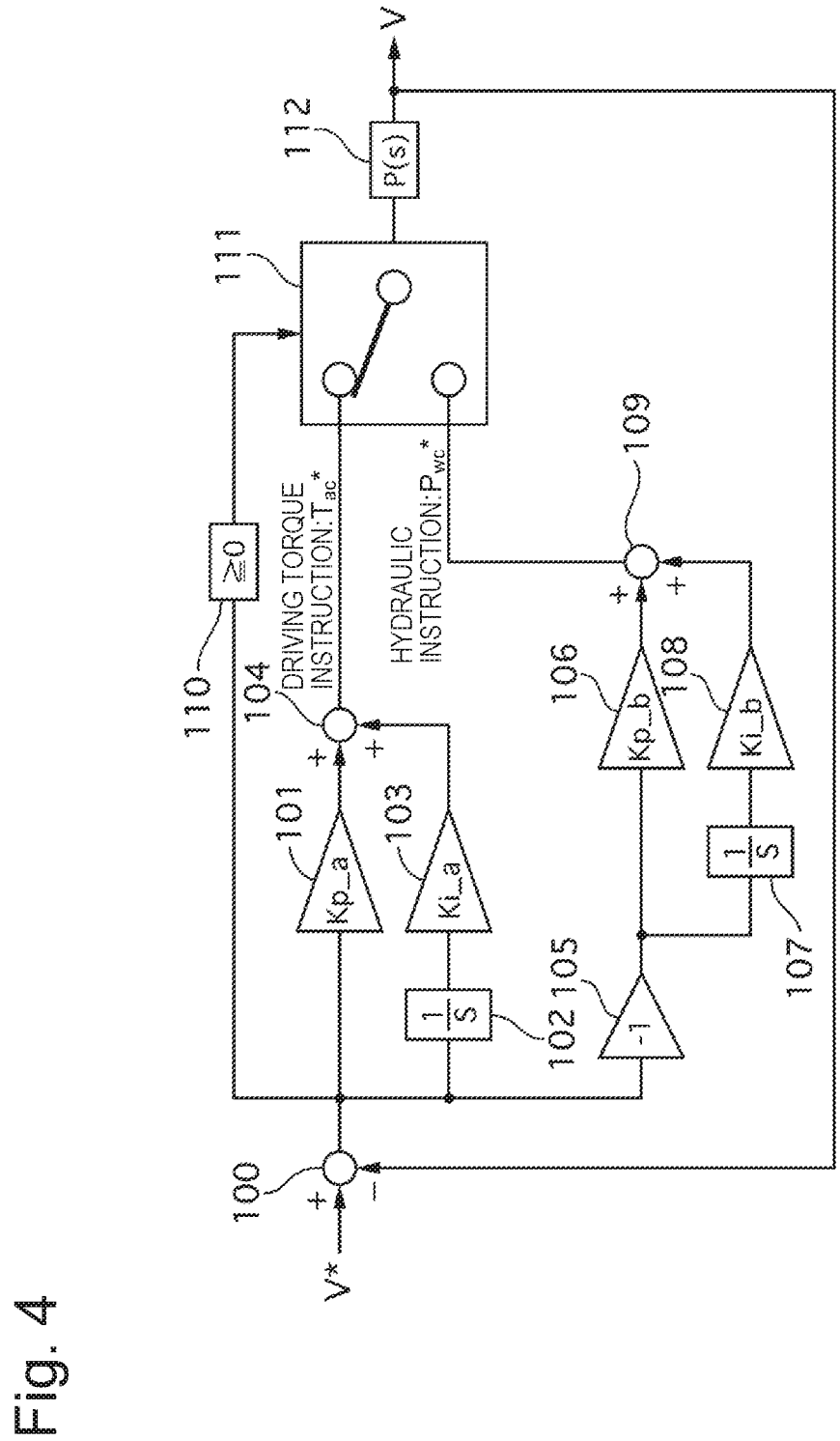
FIG. 4 is a control block diagram of a vehicle speed control unit 55 according to the first embodiment.

FIG. 4 is a control block diagram illustrating the vehicle speed control unit 55 according to the first embodiment.

A subcontractor 100 outputs a vehicle speed deviation (V*−V) according to the vehicle speed V from the vehicle speed instruction V*.

A multiplier 101 multiplies the vehicle speed deviation (V*−V) by a proportional gain Kp_a.

An integrator 102 integrates the vehicle speed deviation (V*−V).

A multiplier 103 multiplies an integrated value of the vehicle speed deviation (V*−V) by an integration gain Ki_a.

An adder 104 outputs a sum of outputs of both the multipliers 101 and 103 as the driving torque instruction $T_{ac}^k$.

A multiplier 105 inverts a sign of the vehicle speed deviation (V*−V).

A multiplier 106 multiplies the vehicle speed deviation after the sign thereof is inverted by a proportional gain Kp_b.

An integrator 107 integrates the vehicle speed deviation after the sign thereof is inverted.

A multiplier 108 multiplies an integrated value of the vehicle speed deviation after the sign thereof is inverted by an integration gain Ki_b.

An adder 109 outputs a sum of outputs of both the multipliers 106 and 108 as the hydraulic instruction $P_{wc}^*$.

A determiner 110 outputs a link driving selection instruction=1 (true) if the vehicle speed deviation (V*−V) is equal to or larger than 0, and outputs the link driving selection instruction=0 (false) if the vehicle speed deviation (V*−V) is smaller than 0.

A switch 111 outputs the driving torque instruction $T_{ac}^*$ if the link driving selection instruction output from the determiner 110 is 1, and outputs the hydraulic instruction $P_{wc}^*$ if the output link driving selection instruction is 0.

A plant model 112 inputs the driving torque instruction $T_{ac}^*$ or the hydraulic instruction $P_{wc}^*$, and outputs the vehicle speed V.

In the above-described manner, the vehicle speed control unit 55 selectively uses, by PI control, the driving motor 1 and the electric hydraulic brake 2 according to whether the vehicle speed deviation (V*−V) is positive or negative. If the vehicle speed deviation is 0 or larger, the vehicle speed control unit 55 drives the driving motor 1 by the driving torque instruction $T_{ac}^*$ calculated with use of the proportional gain Kp_a and the integration gain Ki_a, thereby making the vehicle speed V closer to the vehicle speed instruction V* with use of the driving force generated by the driving motor 1. At this time, the vehicle speed control unit 55 prohibits the braking force from being generated by setting 0 as the hydraulic instruction $P_{wc}^*$ directed to the electric hydraulic brake 2. On the other hand, if the vehicle speed deviation is smaller than 0, the vehicle speed control unit 55 drives the electric hydraulic brake 2 by the hydraulic instruction $P_{wc}^*$ calculated with use of the proportional gain Kp_a and the integration gain Ki_a, thereby making the vehicle speed V closer to the vehicle speed instruction V* with use of the braking force generated by the electric hydraulic brake 2. At this time, the vehicle speed control unit 55 prohibits the driving force from being generated by setting 0 as the driving torque instruction $T_{ac}^*$ directed to the driving motor 1.

[Control of Steering Angle]

Figure 5:
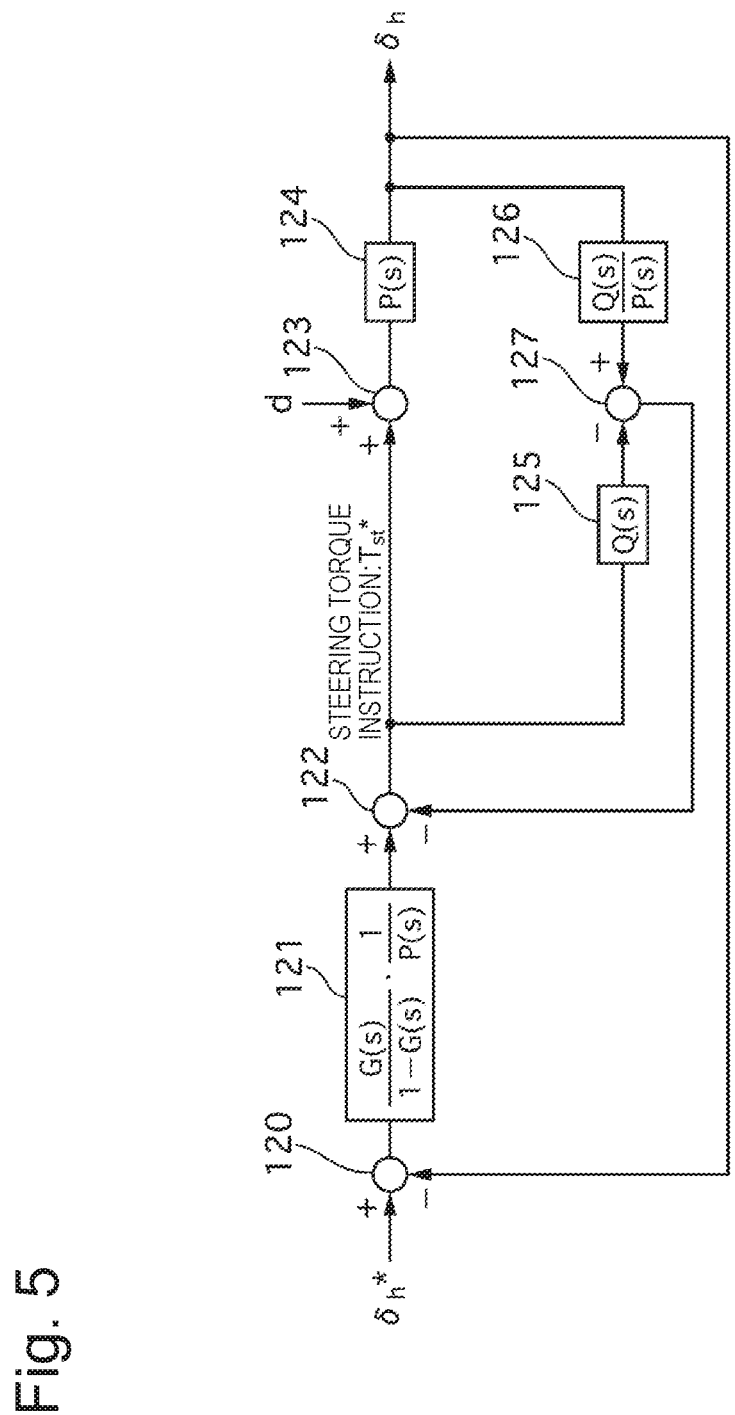
FIG. 5 is a control block diagram of a steering angle control unit 56 according to the first embodiment.

FIG. 5 is a control block diagram illustrating the steering angle control unit 56 according to the first embodiment.

This control is two-degree-of-freedom control using a disturbance observer that cancels out a disturbance d, and can freely set a steering angle response by a target response G.

A subtractor 120 outputs a steering angle deviation ($\delta_h^*-\delta_h$) by subtracting the steering angel $\delta_h$ from the steering angle instruction $\delta_h^*$).

A model matching compensator 121 is a feedback compensator that inputs the steering angle deviation, and outputs an ideal steering torque that allows the steering angle response to match the desired target response G provided in advance.

A subtractor 122 outputs the steering torque instruction $T_{st}^*$ by subtracting a disturbance estimation torque from the ideal steering torque.

An adder 123 adds the disturbance d to the steering torque instruction $T_{st}^*$.

A plant model 124 inputs the steering torque instruction including the disturbance ($T_{st}^*+d$), and outputs the steering angel $\delta_h$.

A noise filter unit 125 filters the steering torque instruction $T_{st}^*$ through a low-pass filter.

An inverted plant model 126 filters the steering torque instruction for acquiring the steering angel $\delta_h$ through the same low-pass filter as the low-pass filter of the noise filter unit 125.

A subtractor 127 outputs the disturbance estimation torque by subtracting an output of the noise filter unit 125 from an output of the inverted plant model 126.

[Basic Motion During Perpendicular Parking]

Figure 6:
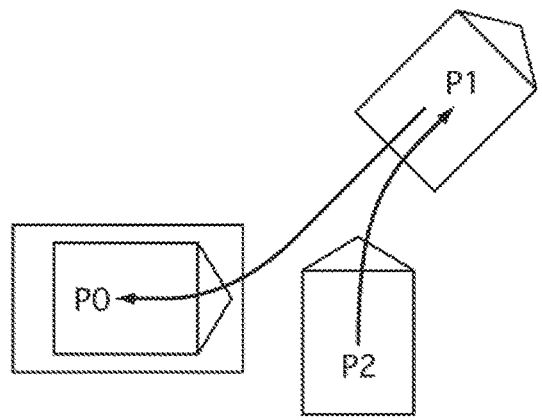
FIG. 6 illustrates a basic vehicle motion during perpendicular parking according to the first embodiment.

FIG. 6 illustrates a basic motion of the vehicle during perpendicular parking according to the first embodiment.

The vehicle moves forward from a parking start position P2 to a running direction switching position P1. After stopping at the running direction switching position P1, the vehicle moves backward from the running direction switching position P1 to the parking end position P0, and then stops at the parking end position P0. The vehicle is steered in a direction away from the parking end position P0 while being moving forward from the parking start position P2 to the running direction switching position P1, and is steered in a direction toward the parking end position P0 while being moving backward from the running direction switching position P1 to the parking end position P0. In other words, if the parking end position P0 is located on a left side of the subject vehicle in the traveling direction, the vehicle is steered rightward while being moving forward and is steered leftward while being moving backward. On the other hand, if the parking end position P0 is located on a right side of the subject vehicle in the traveling direction, the vehicle is steered leftward while being moving forward and is steered rightward while being moving backward.

A series of parking operations is entirely performed by automatic control with use of the driving motor 1, the electric hydraulic brake 2, and the electric power steering 3. Assume that the steering angle is 0 and a steering position is a neutral position at the parking start position P2, the running direction switching position P1, and the parking end position P0. The automatic control increasingly steers the vehicle from a start position to an intermediate point of each of the forward movement and the backward movement, maximizing the steering angel at the intermediate point. Then, the automatic control gradually steers back the vehicle from the intermediate point to an end point of each of the forward movement and the backward movement. Assume that a curvature of the parking trajectory changes at a constant rate with respect to the movement distance, and the parking trajectory is formed by a clothoid curve. The use of the clothoid curve can achieve a smooth vehicle motion and steering operation easily expectable by the driver, thereby allowing the driver to feel a sense of ease toward the automatic control. To create a parking trajectory in which a radius of the rotation is small, the automatic control can also use both the clothoid curve and the circular arc for the parking trajectory by stopping increasingly steering the vehicle before reaching the intermediate point of each of the forward movement and the backward movement, fixing the steering angle until the vehicle moves for a while after passing through the intermediate point, and gradually steering back the vehicle after that.

Figure 7:
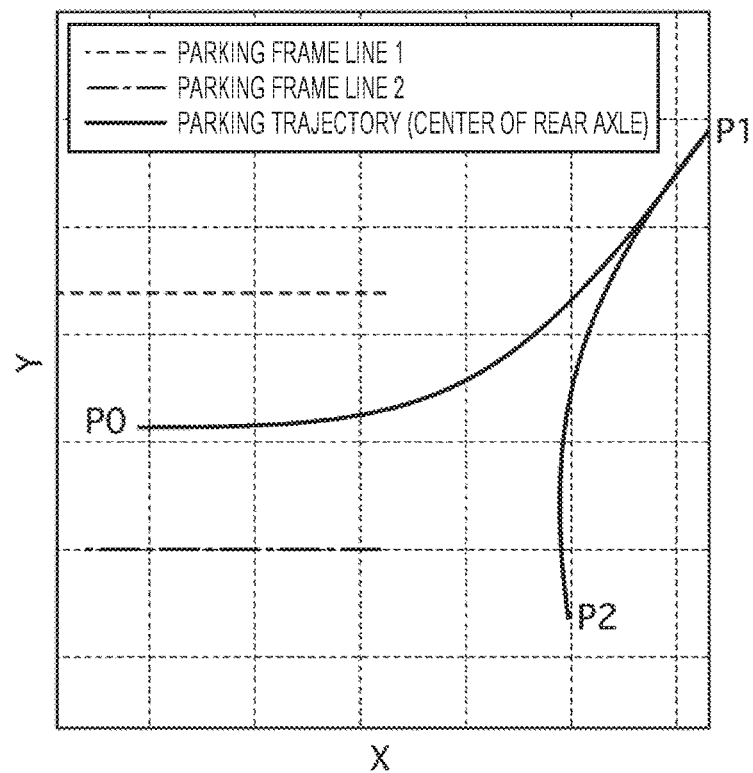
FIG. 7 illustrates a parking trajectory of a center of a rear axle when the parking trajectory is a clothoid curve during the perpendicular parking.

FIG. 7 illustrates the parking trajectory of the center of the rear axle when the parking trajectory is formed by the clothoid curve during the perpendicular parking. An X axis and a Y axis are defined to be a longitudinal direction and a lateral direction of the vehicle at the parking end position P0, respectively. A parking frame line 1 and a parking frame line 2 are defined to be boundaries between a parking frame of the subject vehicle, and a parking frame farther away from the parking start position P2 and a parking frame closer to the parking start position 2 of two parking frames adjacent to the parking frame of the subject vehicle, respectively. Then, to create a parking trajectory in which the radius of the rotation is further small, the automatic control may use only the circular arc without use of the clothoid curve by steering the vehicle while keeping the vehicle stationary only when the vehicle is stopped at the running direction switching position. Further, the steering angle may be another angle than 0 at the parking start position P2, the running direction switching position P1, and/or the parking end position P0.

Figure 8:
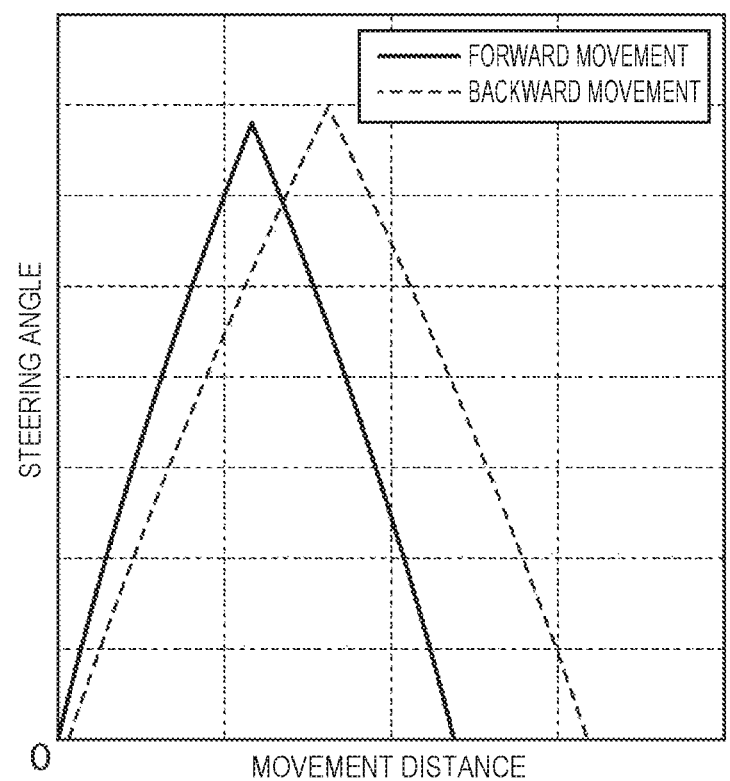
FIG. 8 illustrates a relationship between a movement distance and a steering angle when the parking trajectory is the clothoid curve during the perpendicular parking.

FIG. 8 illustrates a relationship between the movement distance and the steering angle when the parking trajectory is formed by the clothoid curve during the perpendicular parking.

A sign of the steering angle is inverted between the forward movement and the backward movement, but in the present example, both the steering angles of the forward and the backward movements are expressed as positive values. The curve of the clothoid curve changes at a constant rate with respect to a length of the curve, so that the steering angle also changes at an almost constant rate with respect to the movement distance. A relationship between the steering angle $\delta_h$ and a curvature $\chi$ is expressed by the following equation (1) with use of a steering gear ratio N and a wheelbase 1.

$$\delta h = N \tan^{-1}(1 \cdot \chi) \approx N \cdot 1 \cdot \chi \tag{1}$$

In a range where a product of the wheelbase 1 and the curvature $\chi$ is small, approximation of the equation (1) is established, and the change rate of the steering angle is also kept constant if the change rate of the curvature is constant with respect to the movement distance.

The steering angle is 0 for a while when the vehicle starts moving backward in FIG. 8, and this is because, in this section, the vehicle runs backward with the steering angle kept at 0 at the time of a start of the backward movement by a distance as long as excedance of the movement distance when the vehicle moves forward, for compensating for the distance by which the movement distance exceeds a distance with the steering angle kept at 0 at the time of an end of the forward movement due to an error of the vehicle speed under the control of the vehicle speed. This compensation contributes to maintaining accuracy of the parking end position.

Figure 9:
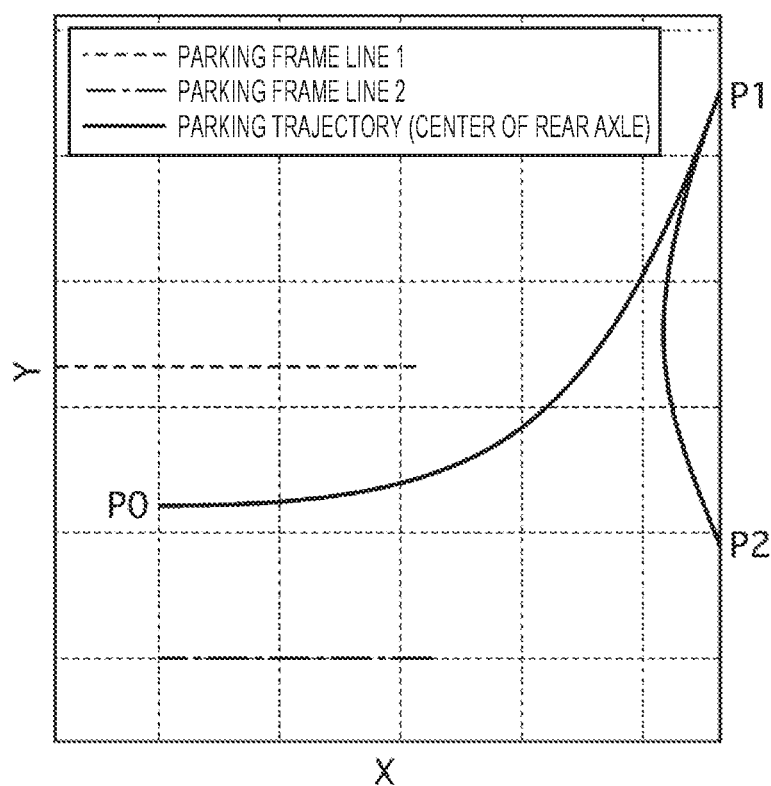
FIG. 9 illustrates a parking trajectory of the center of the real axle when the parking trajectory is formed by the clothoid curve and a circular arc during the perpendicular parking.

FIG. 9 illustrates the parking trajectory of the center of the rear axle when the parking trajectory is formed by the clothoid curve and the circular arc during the perpendicular parking. Since the vehicle faces in a direction toward a parking frame at the parking start position P2, the parking trajectory should be set so that the radius of the rotation is small, and the clothoid curve and the circular arc are used for the parking trajectory.

Figure 10:
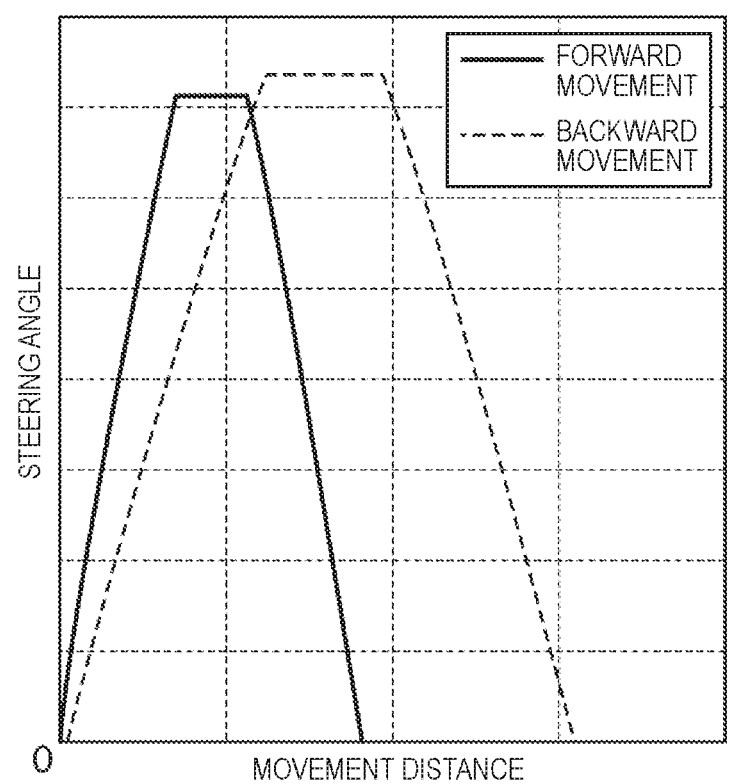
FIG. 10 illustrates a relationship between the movement distance and the steering angle when the parking trajectory is formed by the clothoid curve and the circular arc during the perpendicular parking.

FIG. 10 illustrates a relationship between the movement distance and the steering angle when the parking trajectory is formed by the clothoid curve and the circular arc during the perpendicular parking. The sign of the steering angle is inverted between the forward movement and backward movement, but both the steering angles of the forward movement and the backward movement are expressed as positive values in the present example. A section where the steering angle changes with respect to the movement distance is a section of the clothoid curve, and an approximately intermediate section where the steering angle is kept constant is a section of the circular arc.

[Setting of Parking Trajectory]

Next, a setting of the trajectory of the perpendicular parking that is set by the parking assist apparatus according to the first embodiment will be described. The trajectory of the perpendicular parking is set by the parking trajectory setting unit 51 illustrated in FIG. 3.

Figure 11:
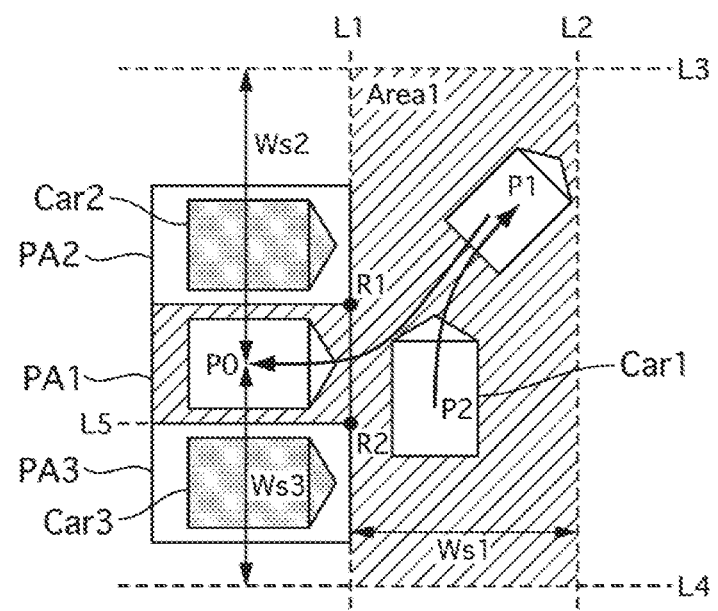
FIG. 11 illustrates a condition for acquiring the trajectory during the perpendicular parking.

FIG. 11 illustrates a condition for acquiring the trajectory of the perpendicular parking. The parking start position P2, the running direction switching position P1, and the parking end position P0 are similar to FIG. 6. Assume that Car1 represents the subject car, PA1 represents a parking frame of the subject vehicle Car1 including the parking end position P0, PA2 and PA3 represent adjacent parking frames on left and right sides of the parking frame PA1, respectively, and Car2 and Car3 represent parked vehicles on the left and right sides, respectively. Assume that the parking start position P2, the running direction switching position P1, and the parking end position P0 are positions of the center of the rear axle of the subject vehicle Car1. The parking end position P0 is located at a center of the lateral direction of the subject vehicle Car1 with respect to the parking frame PA1. The parking end position P0 is set to a position that allows a front edge of the subject vehicle Car1 and a front edge of the parking frame PA1 to be aligned with each other when the vehicle is parked at the parking end position P0.

Further, assume that L1 represents a straight line including the front edge of the parking frame PA1, and L2 represents a straight line extending in parallel with the straight line L1 and located a distance Ws1 away from the straight line L1. Assume that L3 represents a straight line perpendicular to the straight line L2, and located a distance Ws2 away from the parking end position P0 beyond the parked vehicle on the Car2 side, and L4 represents a straight line perpendicular to the straight line L2 and located a distance Ws3 away from the parking end position P0 beyond the parked vehicle on the Car3 side. Further, assume that R1 and R2 represent a point located on an inner side of the vehicle when the vehicle is moving backward from the running direction switching position P1 to the parking end position P0, and another point of both end points of the boundary of the parking frame PA1 that are included in the straight light L1. Further, assume that L5 represents a straight line including the boundary between the parking frames PA1 and PA3.

The limited area setting unit 50a sets an area defined by combining an area surrounded by the straight lines (virtual lines) L1, L2, L3, and L4, and the inside of the parking frame PA1 as a limited area Area1, and the parking trajectory setting unit 51 sets the parking trajectory for the perpendicular parking of the subject vehicle at the parking end position P0 based on the straight lines L1, L2, L3, and L4 in the limited area Area1. The limitation imposed on the area defined by each of the straight lines can also be invalidated by setting each of the distances Ws1, Ws2, and Ws3 to the straight lines L2, L3, and L4 to an infinity. The area defined by the parking frame PA1 and the straight line L1 in Area1 can also be extended to around the parked vehicles Car2 and Car3 by detecting the parked vehicles Car2 and Car3 with use of the cameras 11 to 14.

Figure 12:
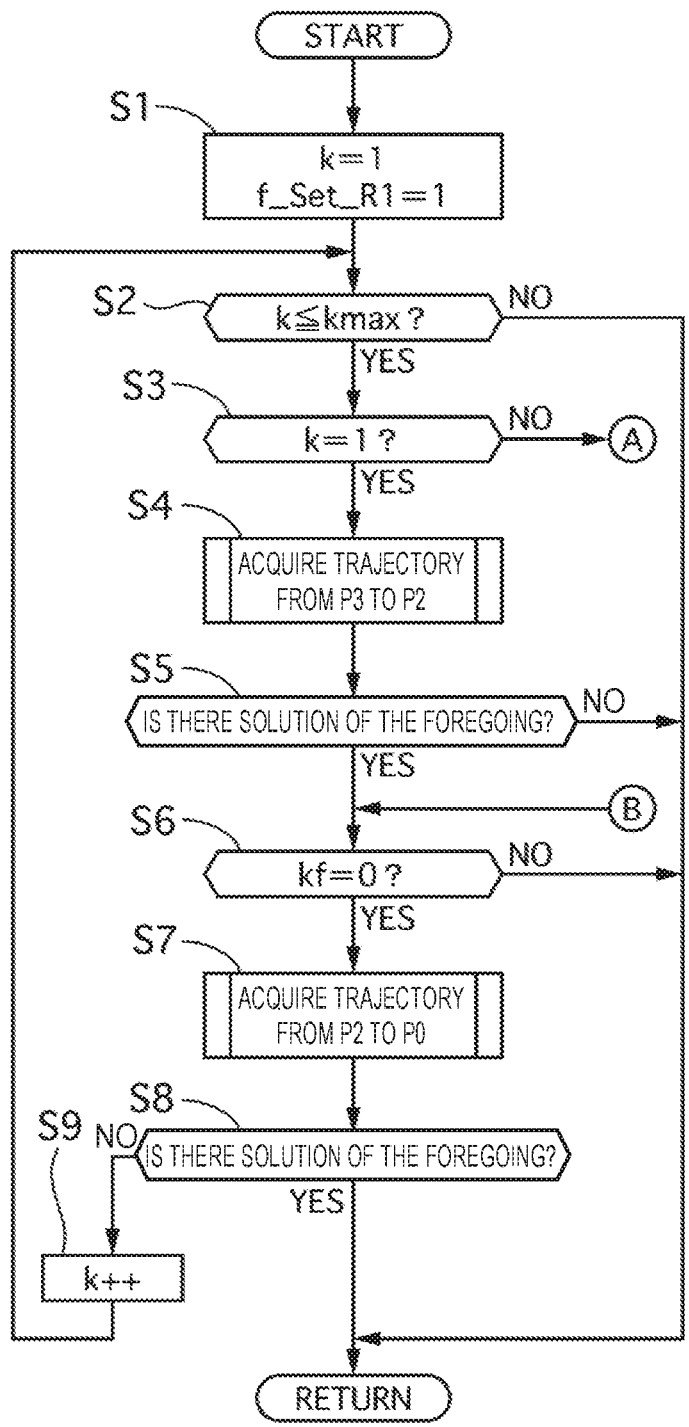
FIG. 12 is a flowchart illustrating a procedure for acquiring the trajectory during the perpendicular parking.
Figure 13:
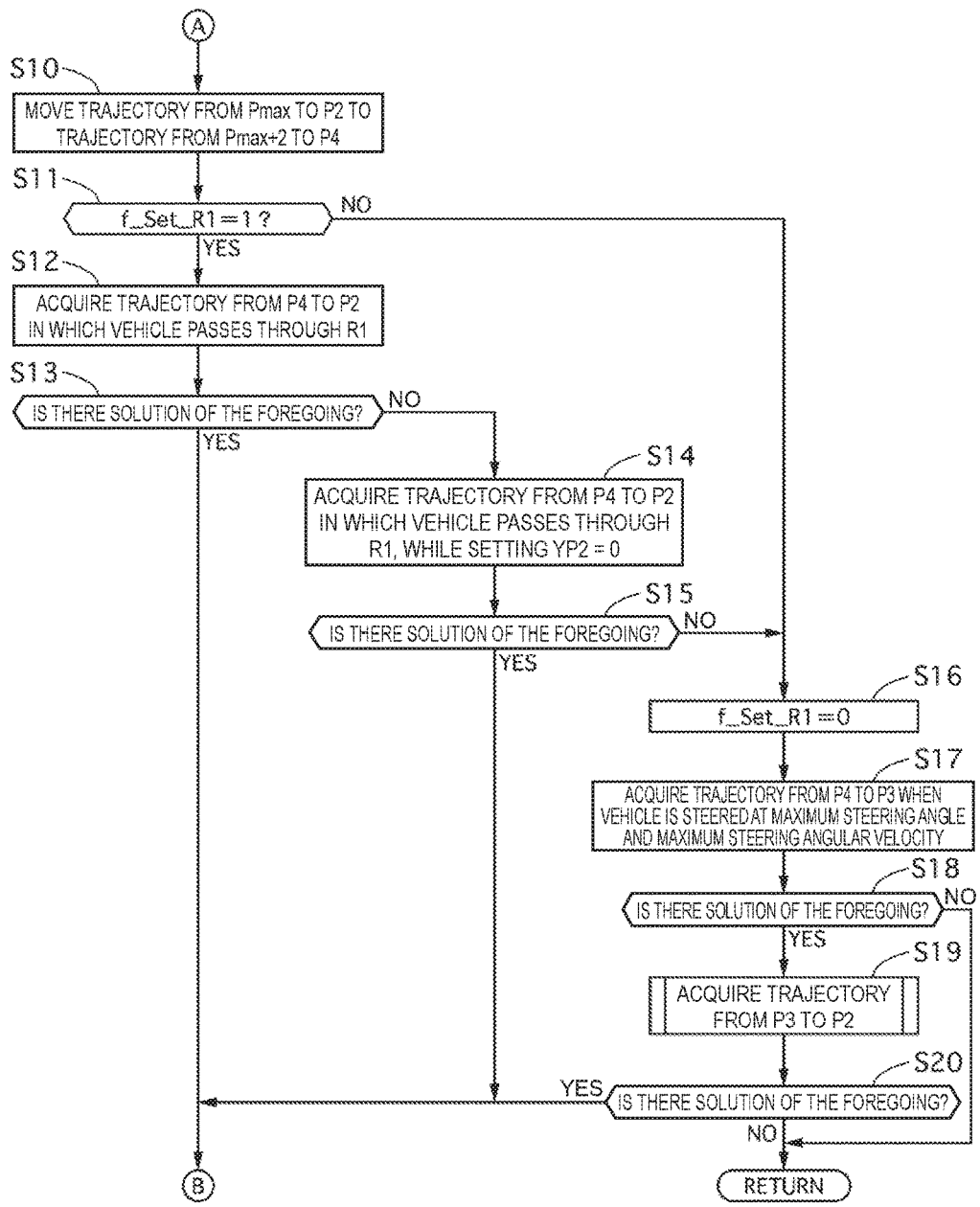
FIG. 13 is a flowchart illustrating the procedure for acquiring the trajectory during the perpendicular parking.

FIGS. 12 and 13 are flowcharts for acquiring the parking trajectory. The parking trajectory illustrated in FIG. 6 is indicated as a trajectory from P2 to P1 to P0, but assume that the number of positions where the running direction is switched increases like . . . P4 to P3 to P2 to P1 to P0 as the number of times that the running direction is switched increases, and a maximum number is assigned to an index of the parking start position and a minimum number 0 is assigned to an index of the parking end position. Assume that Pn represents the position of the center of the rear axle at each of the running direction switching positions. A trajectory from Pn+1 to Pn indicates such a trajectory that the vehicle is steered leftward while moving backward if n is an even number, while indicating such a trajectory that the vehicle is steered rightward while moving forward if n is an odd number. In this case, the direction in which the vehicle is steered is the direction when the parking end position is located on the left side with respect to the parking start position, and the direction in which the vehicle is steered is reversed if the parking end position is located on the right side with respect to the parking start position. Further, the flowcharts illustrated in FIGS. 12 and 13 include steps S4, S7, S12, S14, S17, and S19 where the trajectory is acquired, but details thereof will be described below.

In step S1, the parking trajectory setting unit 51 sets the number k of times that the running direction is switched to k=1, and sets a flag f_Set_R1 indicating whether the vehicle passes through R1 to f_Set_R1=1.

In step S2, if the number k of times that the running direction is switched is an upper limit value kmax or smaller, the flow proceeds to step S3. If the number k of times that the running direction is switched is larger than the upper limit value kmax, the flow proceeds to RETURN.

In step S3, if the number k of times that the running direction is switched is k=1, the flow proceeds to step S4. If the number k of times that the running direction is switched is another value than 1, the flow proceeds to step S10.

In step S4, the parking trajectory setting unit 51 acquires a trajectory when the vehicle moves backward from P3 to P2. Processing procedures in steps S4 and S19 are as indicated in flowcharts illustrated in FIGS. 14 and 15, which will be described below.

If there is a solution from step S4 in step S5, the flow proceeds to step S6. If not, the flow proceeds to RETURN.

If a value kf indicating whether to continue or end the calculation is 0 in step S6, the flow proceeds to step S7. If the value kf is another value than 0, the flow proceeds to RETURN. The value kf set to 1 indicates that the calculation is ended with the parking trajectory acquired. The value kf set to 2 indicates that the calculation is ended without the parking trajectory acquired.

In step S7 (a second trajectory calculation unit), the parking trajectory setting unit 51 acquires a trajectory from P2 to P0 like the example illustrated in FIG. 6, with use of a third parking trajectory setting unit (a third parking trajectory calculation unit) 51c thereof.

If there is a solution from step S7 in step S8, the flow proceeds to RETURN. If not, the flow proceeds to step S9.

In step S9, the parking trajectory setting unit 51 adds 1 to the number k of times that the running direction is repeatedly switched. Then, the flow returns to step S2.

In step S10, the parking trajectory setting unit 51 adds 2 to the respective numbers of the indices in the trajectory from the parking start position Pmax to P2, which is a result of the calculation of the trajectory that has been carried out until this time, thereby correcting the trajectory into a trajectory from Pmax+2 to P4. The parking trajectory setting unit 51 can acquire a parking trajectory from Pmax+2 to P2 including an increase in the number of times that the running direction is switched, by calculating a new trajectory from P4 to P2 after that.

If the flag is set to f_Set_R1=1 in step S11, the flow proceeds to step S12. If the flag is set to another value than 1 in step S11, the flow proceeds to step S16.

In step S12, the parking trajectory setting unit 51 acquires the trajectory from P4 to P2 in which the vehicle passes through R1, with use of the third parking trajectory setting unit 51c thereof.

If there is a solution from step S12 in step S13, the flow proceeds to step S6. If there is no solution from step S12 in step S13, the flow proceeds to step S14.

In step S14, the parking trajectory setting unit 51 acquires the trajectory from P4 to P2 in which the vehicle passes through R1 similarly to step S12, while setting 0 as YP2, which is a Y coordinate of P2.

If there is a solution from step S14 in step S15, the flow proceeds to step S6. If there is no solution from step S14 in step S15, the flow proceeds to step S16.

In step S16, the parking trajectory setting unit 51 sets f_Set_R1=0. If the parking trajectory setting unit 51 cannot acquire the trajectory from P4 to P2 in which the vehicle passes through R1 once in steps S12 and S14, this means that the vehicle cannot pass through R1 even if being steered at the maximum steering angle and the maximum steering angular velocity of the steering apparatus mounted on the vehicle while the running direction is switched after that. Therefore, in this case, the parking trajectory setting unit 51 sets f_Set_R1=0, thereby skipping the processing procedures in steps S12 and S14 by the determination in step S11 even when acquiring the trajectory from P4 to P2 again while increasing the number of times that the running direction is switched, to acquire a trajectory from P4 to P2 in which the vehicle does not pass through R1 in steps S17 and S19.

In step S17, the parking trajectory setting unit 51 acquires a trajectory from P4 to P3 when the vehicle is steered at the maximum steering angle and the maximum steering angular velocity.

If there is a solution from step S17 in step S18, the flow proceeds to step S19. If there is no solution from step S17 in step S18, the flow proceeds to RETURN.

In step S19, the parking trajectory setting unit 51 acquires a trajectory from P3 to P2 by similar processing to step S4.

If there is a solution from step S19 in step S20, the flow proceeds to step S6. If there is no solution from step S19 in step S20, the flow proceeds to RETURN.

Next, a procedure for acquiring the trajectory in which the vehicle moves backward from P3 to P2 in steps S4 and S19 illustrated in FIGS. 12 and 13 will be described with reference to the flowcharts illustrated in FIGS. 14 and 15.

Figure 16:
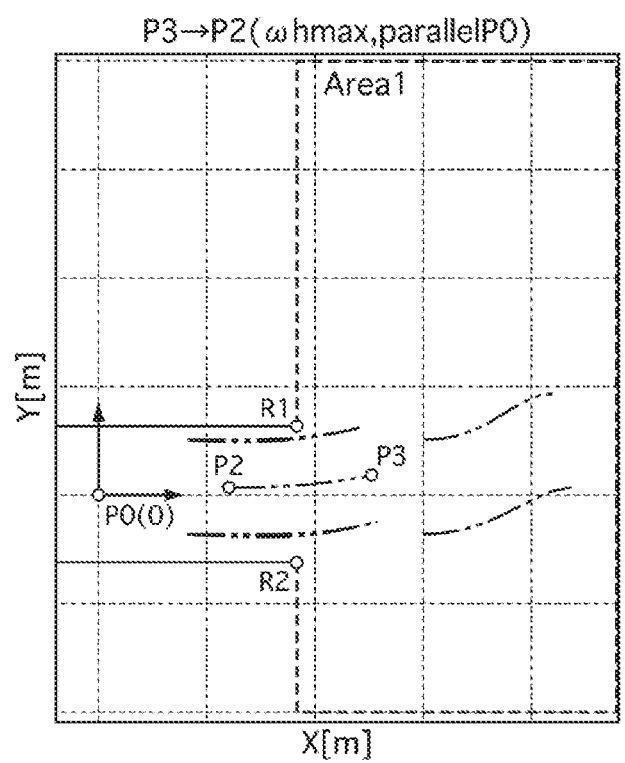
FIG. 16 illustrates an example that acquires the trajectory from P3 to P2 when the vehicle moves backward until being positioned in parallel with a parking end position P0 at a maximum steering angle and a maximum steering angular speed.

In step S30, the parking trajectory setting unit 51 acquires the trajectory from P3 to P2 when the vehicle moves backward until reaching the parking end position P0 at the maximum steering angle and the maximum steering angular velocity as illustrated in FIG. 16. FIG. 16 illustrates Area1 illustrated in FIG. 11, and trajectories of longitudinal and lateral edges of the vehicle, the center of the rear axle, and lateral edges of the rear axle. If the vehicle is steered only at the front wheels, a center of a curve of the vehicle is located on an extension of the rear axle, so that the longitudinal and lateral edges of the vehicle draws an outermost trajectory of the vehicle and the lateral edges of the rear axle draws an innermost trajectory of the vehicle when the vehicle is curved. Therefore, if both the trajectories of the longitudinal and lateral edges of the vehicle and the lateral edges of the rear axle are contained within Area1, this means that the trajectory of the entire vehicle is contained in Area1.

If there is a solution from step S30 in step S31, the flow proceeds to step S32. If there is no solution from step S30 in step S31, the processing is ended.

In step S32, the parking trajectory setting unit 51 determines whether the vehicle passes through outside R1 while moving from P3 to P2. If the vehicle passes through outside R1, the flow proceeds to step S33. If the vehicle does not pass through outside R1, the flow proceeds to step S43. In the example illustrated in FIG. 16, the vehicle passes through outside R1, whereby the flow proceeds to step S33. X and Y coordinate axes and a coordinate origin 0 are defined as illustrated in FIG. 16 (the X and Y axes are defined to be the longitudinal direction and the lateral direction of the vehicle at the parking end position P0, respectively), and the coordinate origin 0 is set to the parking end position P0.

If the Y coordinate of P2 is YP2≥0 as illustrated in FIG. 16 in step S33 (a first trajectory calculation unit), the flow proceeds to step S34. If the Y coordinate of P2 is smaller than 0 in step S33, the flow proceeds to step S37.

Figure 17:
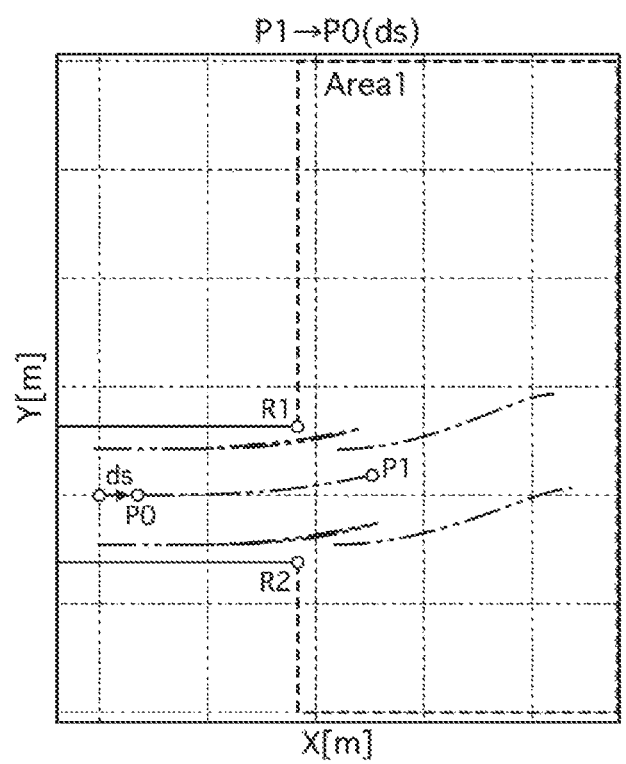
FIG. 17 illustrates an example that acquires a trajectory from P1 to P0

In step S34, the parking trajectory setting unit 51 acquires a trajectory from P1 to P0 as illustrated in FIG. 17, while setting P3 as P1. At this time, the position of P0 is set to an arbitrary point to which P0 is displaced from the original parking end position to a positive side on the X axis, and an amount of the displacement of P0 is assumed to be ds. When the amount ds is ds>0, the vehicle can reach the original parking end position by moving backward straight by a distance as long as ds after repeatedly switching the running direction from the parking start position Pmax to P0.

If there is a solution from step S34 in step S35, the flow proceeds to step S36. If there is no solution from step S34 in step S35, the processing is ended.

In step S36, the parking trajectory setting unit 51 moves a trajectory from Pmax to P3 to a trajectory from Pmax−2 to P1, and sets kf=1 since the parking trajectory from the parking start position to the parking end position is acquired.

If the Y coordinate of P2 is YP2≥−Wp in step S37, the flow proceeds to step S38. If the Y coordinate of P2 is YP2<−Wp, the flow proceeds to step S39. Wp is a distance from left-side and right-side surfaces of the vehicle to the parking frame PA1 when the vehicle Car1 is parked at the center of the parking frame PA1 in the lateral direction in FIG. 11.

Figure 18:
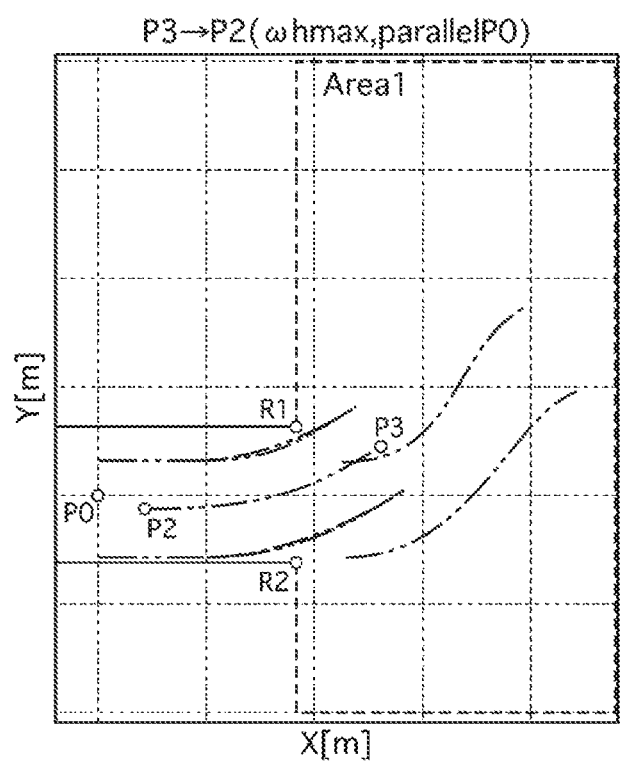
FIG. 18 illustrates an example that acquires the trajectory from P3 to P2 when the vehicle moves backward until being positioned in parallel with the parking end position P0 at the maximum steering angle and the maximum steering angular speed.
Figure 19:
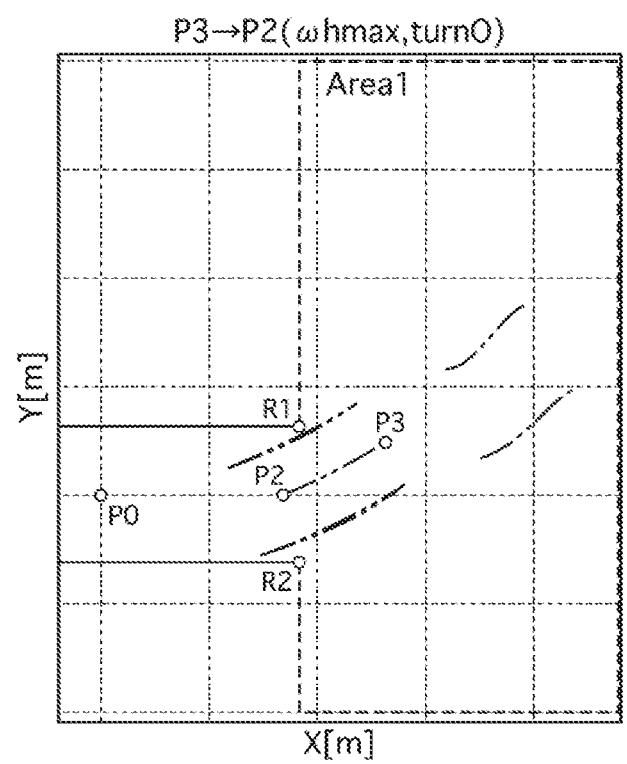
FIG. 19 illustrates an example that acquires the trajectory from P3 to P2 when the vehicle moves backward until YP2=0 is established at the maximum steering angle and the maximum steering angular speed.

In step S38, the parking trajectory setting unit 51 acquires the trajectory from P3 to P2 when the vehicle moves backward at the maximum steering angle and the maximum steering angular velocity, with P2 set to a position where YP2=0 is established while the vehicle is moving backward, with use of a second parking trajectory setting unit (a second parking trajectory calculation unit) 51b thereof. FIG. 18 illustrates an example in which the Y coordinate of P2 is 0>YP2≥−Wp, and, in this case, a lateral position (the position in the Y axis direction) is offset when the vehicle is positioned in parallel with the parking end position P0. When the vehicle has moved backward as far as this position, the vehicle should be repositioned sideways to reach the parking end position after that, which leads to an increase in the number of times that the running direction is switched, and thus an increase in the movement distance. Therefore, the parking trajectory setting unit 51 acquires the trajectory from P3 to P2, with P2 set to the position where YP2=0 is established while the vehicle is moving backward. FIG. 19 illustrates an example of the acquired trajectory.

Figure 20:
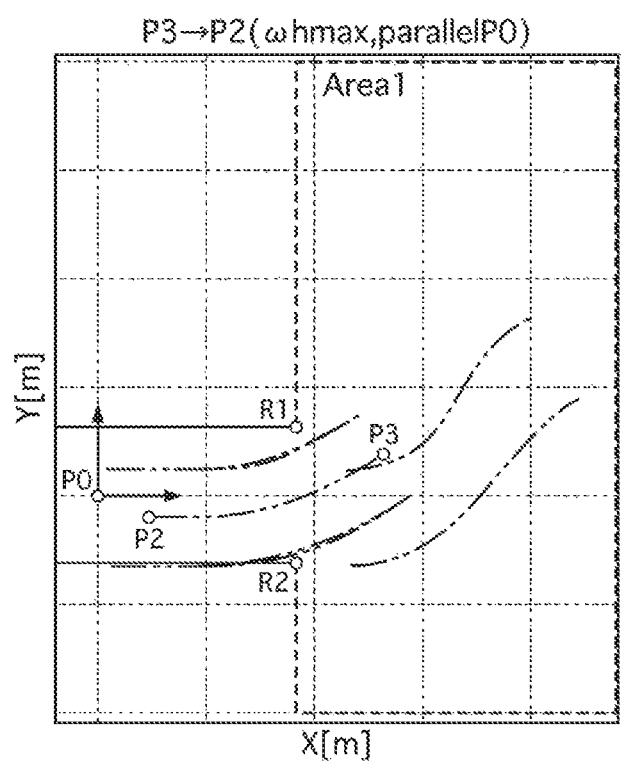
FIG. 20 illustrates an example that acquires the trajectory from P3 to P2 when the vehicle moves backward until being positioned in parallel with the parking end position P0 at the maximum steering angle and the maximum steering angular speed.
Figure 21:
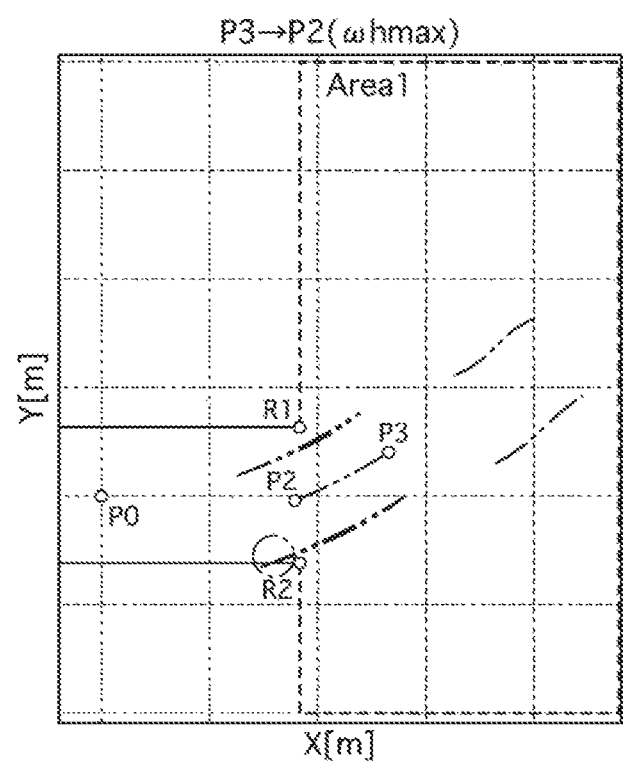
FIG. 21 illustrates an example that acquires the trajectory from P3 to P2 when the vehicle moves backward until contacting a straight line L5 at the maximum steering angle and the maximum steering angular speed.
Figure 22:
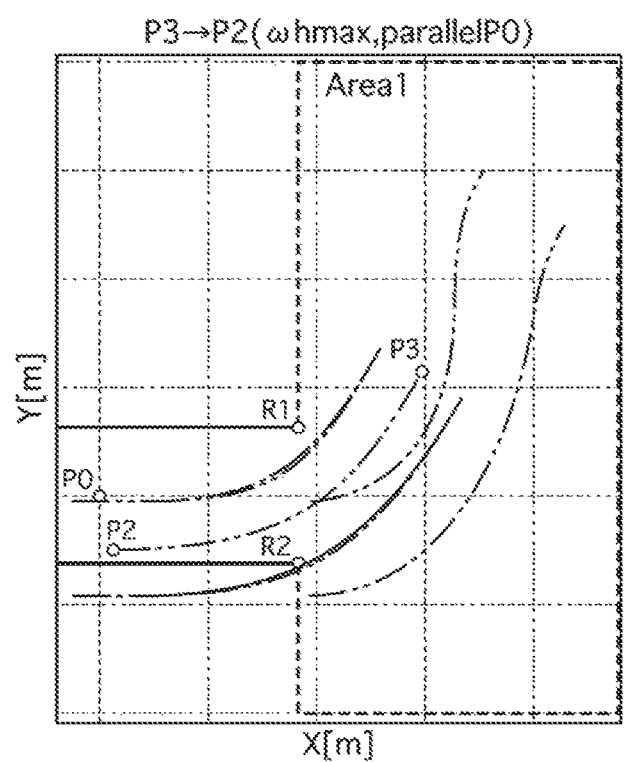
FIG. 22 illustrates an example that acquires the trajectory from P3 to P2 when the vehicle moves backward until being positioned in parallel with the parking end position P0 at the maximum steering angle and the maximum steering angular speed.
Figure 23:
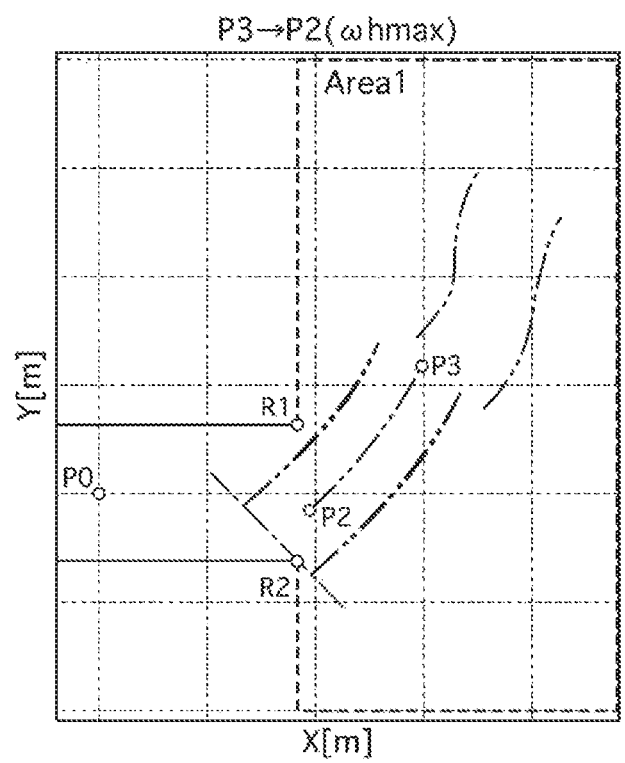
FIG. 23 illustrates an example that acquires the trajectory from P3 to P2 when the vehicle moves backward until contacting R2 at the maximum steering angle and the maximum steering angular speed.

In step S39, the parking trajectory setting unit 51 acquires the trajectory from P3 to P2 when the vehicle moves backward at the maximum steering angle and the maximum steering angular velocity, with use of a first parking trajectory setting unit (a first parking trajectory calculation unit) 51a thereof. FIG. 20 illustrates an example in which the Y coordinate of P2 is YP2<−Wp, and, in this case, the parking trajectory setting unit 51 acquires the trajectory from P3 to P2 when the vehicle moves backward at the maximum steering angle and the maximum steering angular velocity. FIG. 21 illustrates a result of acquiring the trajectory. In FIG. 21, the rear right end of the vehicle is in contact with the straight line L5 illustrated in FIG. 11 at P2. FIG. 22 also illustrate an example in which the Y coordinate of P2 is YP2<−Wp, and a rear edge surface of the vehicle is in contact with R2 at P2 as illustrated in FIG. 23 if the parking trajectory setting unit 51 acquires the trajectory from P3 to P2 when the vehicle moves backward at the maximum steering angle and the maximum steering angular velocity.

Figure 24:
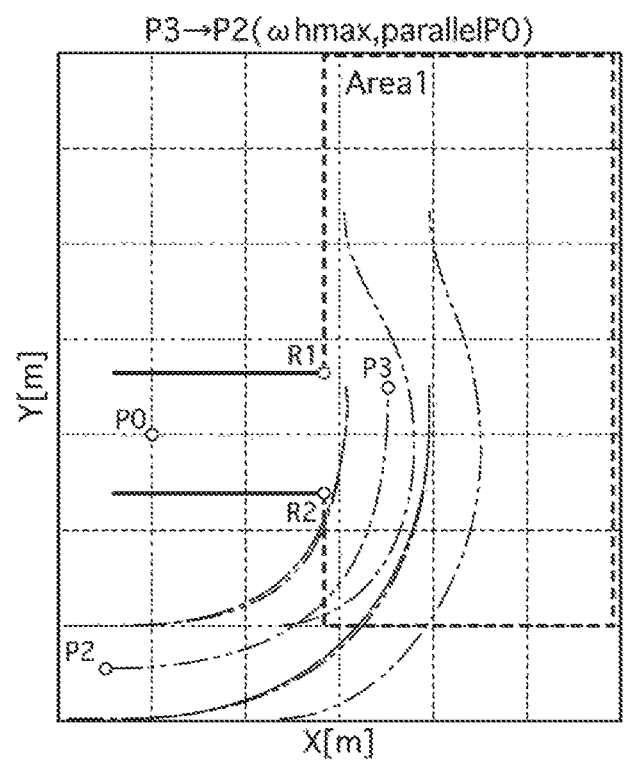
FIG. 24 illustrates an example that acquires the trajectory from P3 to P2 when the vehicle moves backward until being positioned in parallel with the parking end position P0 at the maximum steering angle and the maximum steering angular speed.
Figure 25:
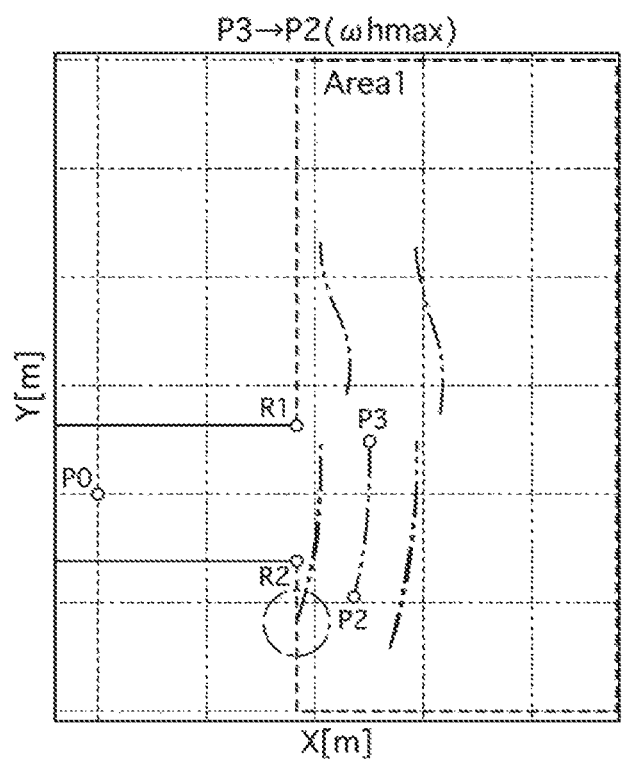
FIG. 25 illustrates an example that acquires the trajectory from P3 to P2 when the vehicle moves backward until contacting a straight line L1 at the maximum steering angle and the maximum steering angular speed.
Figure 26:
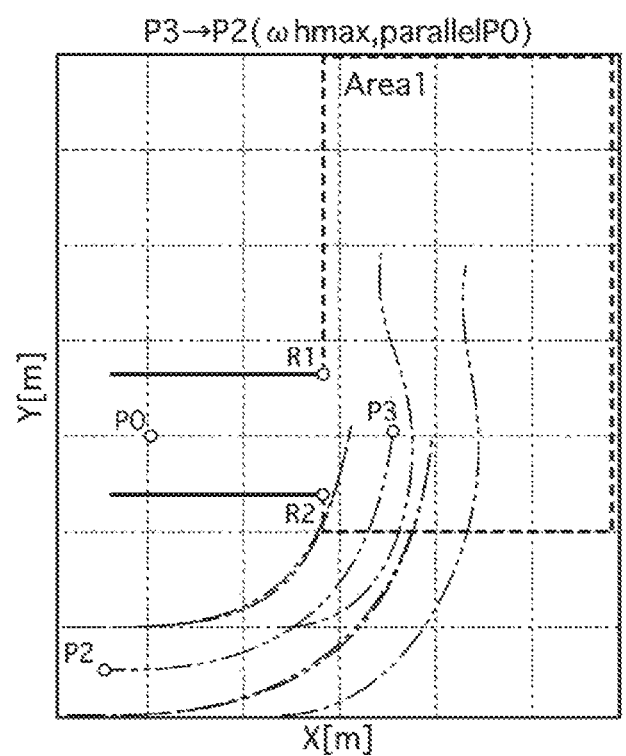
FIG. 26 illustrates an example that acquires the trajectory from P3 to P2 when the vehicle moves backward until being positioned in parallel with the parking end position P0 at the maximum steering angle and the maximum steering angular speed.
Figure 27:
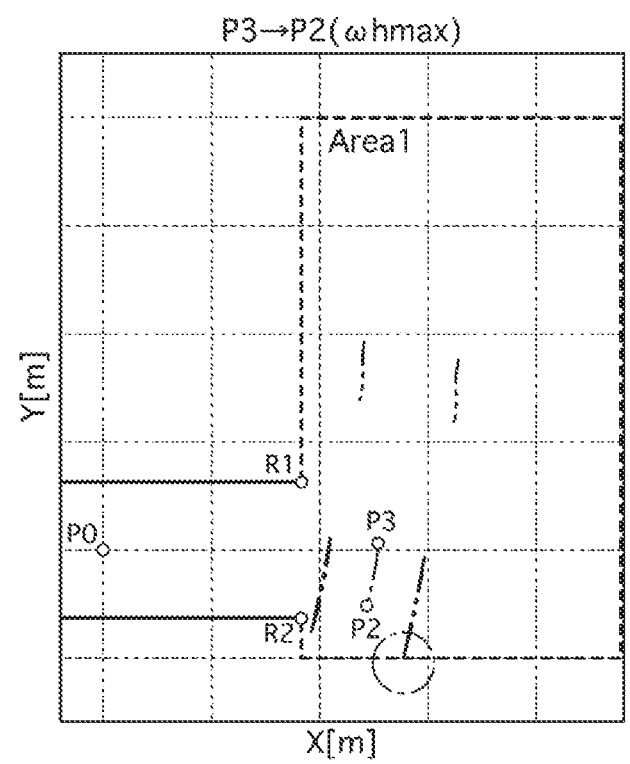
FIG. 27 illustrates an example that acquires the trajectory from P3 to P2 when the vehicle moves backward until contacting a straight line L4 at the maximum steering angle and the maximum steering angular speed.

FIG. 24 also illustrate an example in which the Y coordinate of P2 is YP2<−Wp, and a rear left end of the vehicle is in contact with the straight line L1 illustrated in FIG. 11 at P2 as illustrated in FIG. 25 if the parking trajectory setting unit 51 acquires the trajectory from P3 to P2 when the vehicle moves backward at the maximum steering angle and the maximum steering angular velocity. FIG. 26 also illustrate an example in which the Y coordinate of P2 is YP2<−Wp, and the rear right end of the vehicle is in contact with the straight line L4 illustrated in FIG. 11 at P2 as illustrated in FIG. 27 if the parking trajectory setting unit 51 acquires the trajectory from P3 to P2 when the vehicle moves backward at the maximum steering angle and the maximum steering angular velocity.

If there is no solution from step S39 in step S40, the processing is ended. If there is a solution from step S39 in step S40, the flow proceeds to step S41.

In step S41, the parking trajectory setting unit 51 compares the Y coordinate YP2 of P2 that has been acquired in step S39 with a preset lower limit value YP2 min of YP2. If this comparison results in YP2<YP2 min, the flow proceeds to step S42. If the comparison results in YP2≥YP2 min, the processing is ended.

Figure 28:
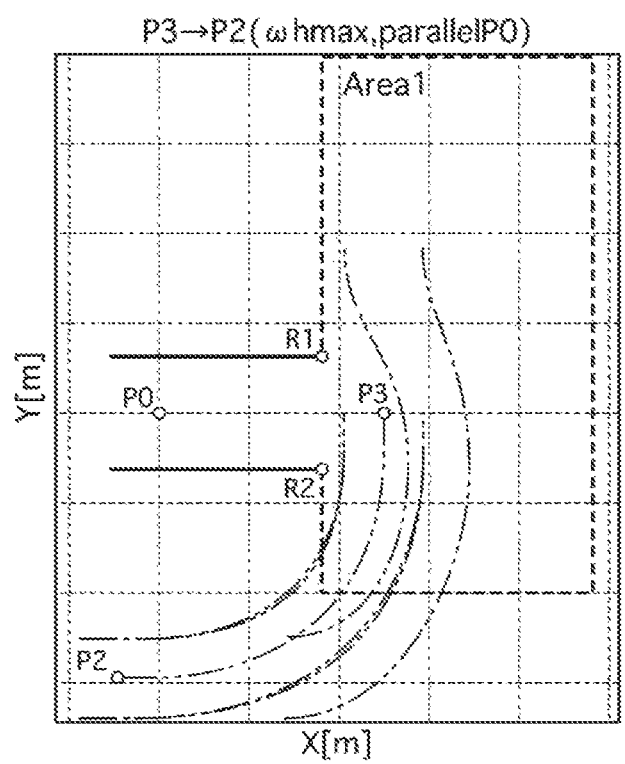
FIG. 28 illustrates an example that acquires the trajectory from P3 to P2 when the vehicle moves backward until being positioned in parallel with the parking end position P0 at the maximum steering angle and the maximum steering angular speed.
Figure 29:
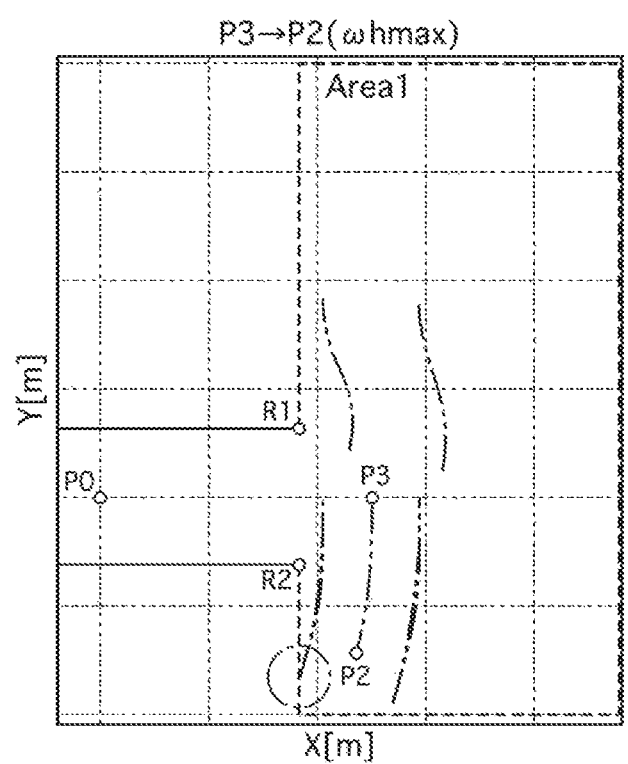
FIG. 29 illustrates an example that acquires the trajectory from P3 to P2 when the vehicle moves backward until contacting the straight line L1 at the maximum steering angle and the maximum steering angular speed.

In step S42, the parking trajectory setting unit 51 deletes the trajectory from P3 to P2. FIG. 28 illustrates an example in which the Y coordinate of P2 is YP2<−Wp, and the rear left end of the vehicle is in contact with the straight line L1 illustrated in FIG. 11 at P2 as illustrated in FIG. 29 similarly to FIG. 25 if the parking trajectory setting unit 51 acquires the trajectory P3 to P2 when the vehicle moves backward at the maximum steering angle and the maximum steering angular velocity in step S39. However, while the Y coordinate of P2 is YP2≥YP2 min in FIG. 25, the Y coordinate of P2 is YP2<YP2 min in FIG. 29, so that the trajectory from P3 to P2 is deleted and the trajectory is generated in such a manner that the vehicle moves forward without moving backward from P3. The rear portion of the vehicle should be approaching an entrance of the parking frame PA1 while the running direction is repeatedly switched to allow the vehicle to be parked at the parking end position P0 with a small number of times that the running direction is switched and a short movement distance, whereby the backward movement is corrected into the forward movement if the trajectory from P3 to P2 like the example illustrated in FIG. 29 is generated.

Figure 30:
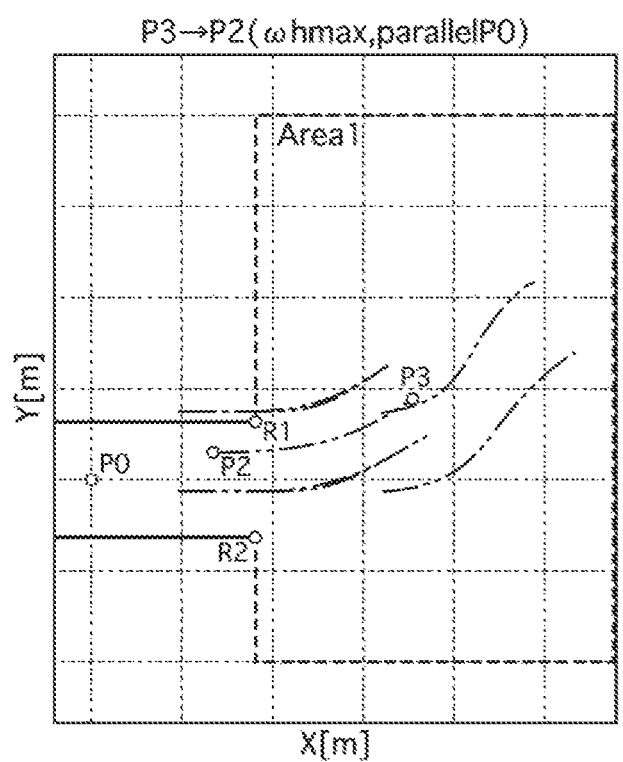
FIG. 30 illustrates an example that acquires the trajectory from P3 to P2 when the vehicle moves backward until being positioned in parallel with the parking end position P0 at the maximum steering angle and the maximum steering angular speed.
Figure 31:
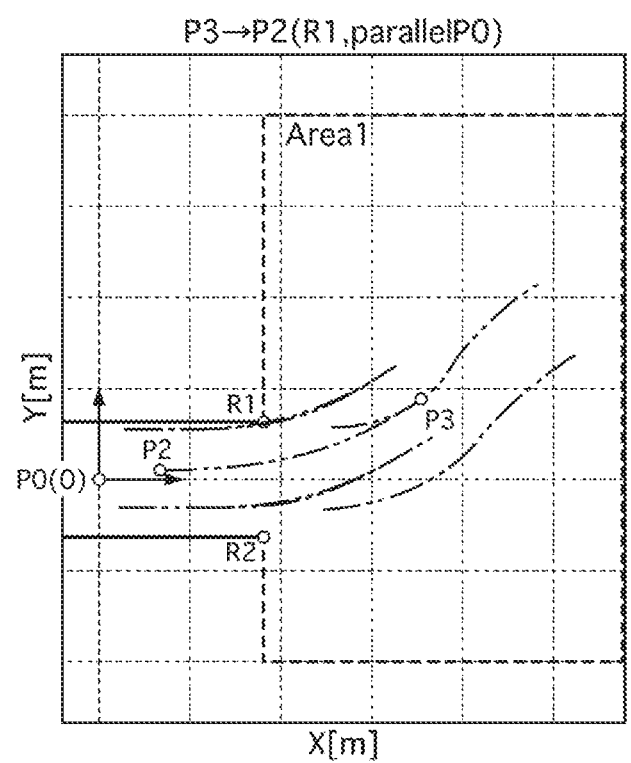
FIG. 31 illustrates an example that acquires the trajectory from P3 to P2 when the vehicle moves backward until being positioned in parallel with the parking end position P0 after passing through R1.

In step S43, if the trajectory from P3 to P2 acquired in step S30 passes through inside R1 as illustrated in FIG. 30, the parking trajectory setting unit 51 acquires the trajectory from P3 to p2 when the vehicle moves backward until being positioned in parallel with the parking end position P0 after passing through R1 as illustrated in FIG. 31, without employing the maximum steering angle and the maximum steering angular velocity as illustrated in FIG. 30.

If there is a solution from step S43 in step S44, the flow proceeds to step S45. If there is no solution from step S43 in step S44, the processing is ended.

If the Y coordinate YP2 of P2 acquired in step S43 is YP2≥0 in step S45, the flow proceeds to step S46. If the Y coordinate YP2 of P2 acquired in step S43 is YP2<0 in step S45, the flow proceeds to step S49. FIG. 31 illustrates an example in which the Y coordinate of P2 is YP2≥0.

Figure 32:
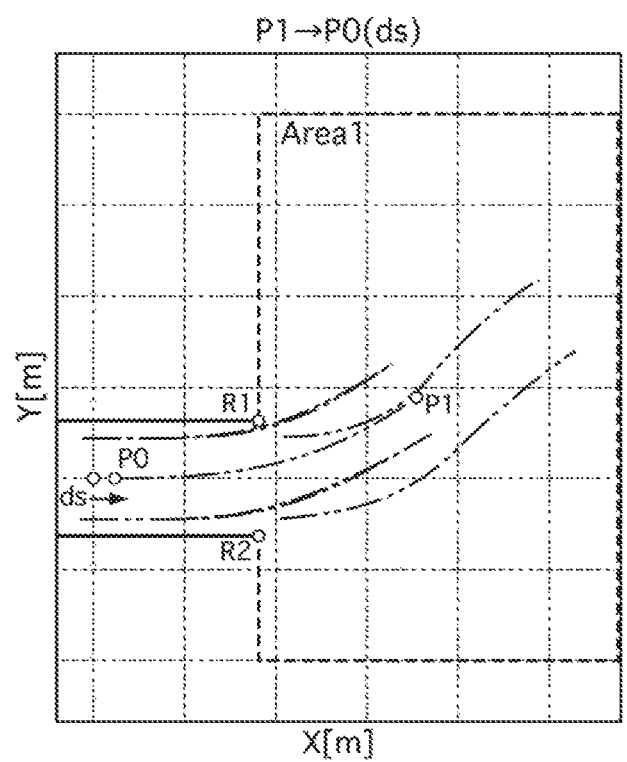
FIG. 32 illustrates an example that acquires the trajectory from P1 to P0.

In step S46 (the first trajectory calculation unit), the parking trajectory setting unit 51 acquires the trajectory from P1 to P0 as illustrated in FIG. 32, while setting P3 as P1 similarly to step S34. The position of P0 is set to an arbitrary point to which P0 is displaced from the original parking end position to the positive side on the X axis, and the amount of the displacement of P0 is assumed to be ds.

If there is a solution from step S46 in step S47, the flow proceeds to step S48. If there is no solution from step S46 in step S47, the processing is ended.

In step S48, the parking trajectory setting unit 51 moves the trajectory from Pmax to P3 to the trajectory from Pmax−2 to P1 similarly to step S36, and sets kf=1 since the parking trajectory from the parking start position and the parking end position has been acquired.

If a determination in step S49 results in YP2≥−Wp, the flow proceeds to step S50. If the determination in step S49 results in YP2<−Wp, the flow proceeds to step S51.

Figure 33:
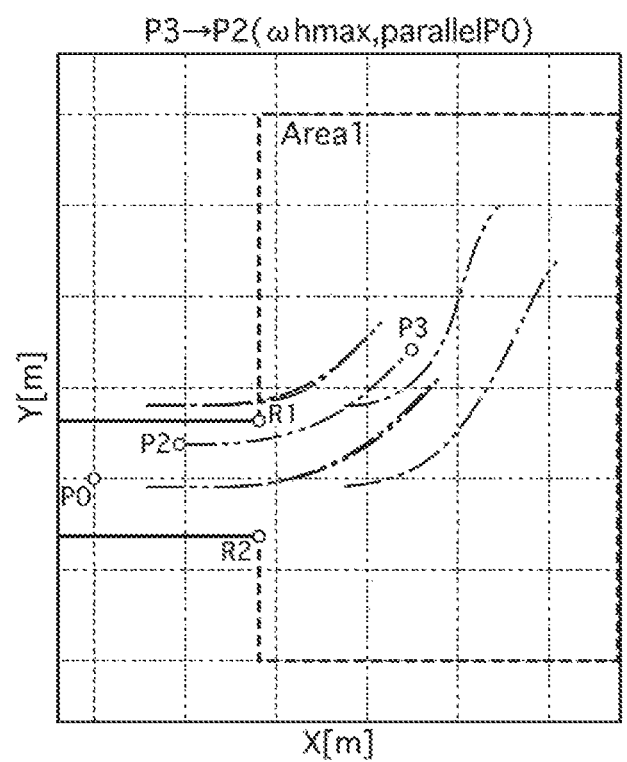
FIG. 33 illustrates an example that acquires the trajectory from P3 to P2 when the vehicle moves backward until being positioned in parallel with the parking end position P0 at the maximum steering angle and the maximum steering angular speed.
Figure 34:
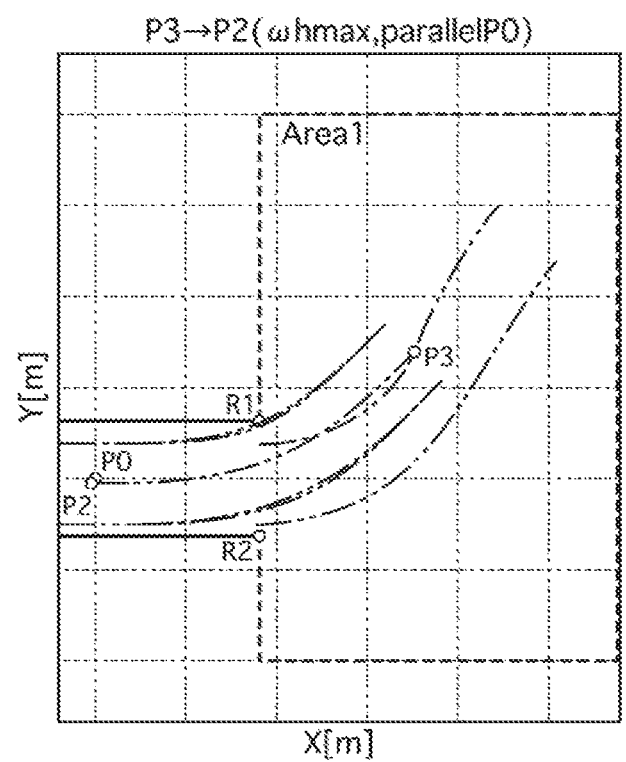
FIG. 34 illustrates an example that acquires the trajectory from P3 to P2 when the vehicle moves backward until being positioned in parallel with the parking end position P0 after passing through R1.
Figure 35:
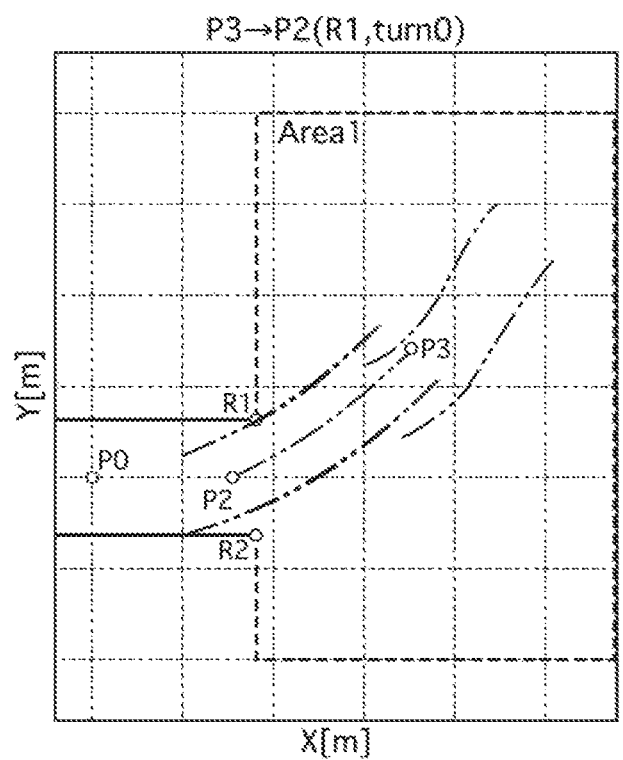
FIG. 35 illustrates an example that acquires the trajectory from P3 to P2 when the vehicle moves backward until YP2=0 is established after passing through R1.

In step S50, the parking trajectory setting unit 51 acquires the trajectory from P3 to p2 when the vehicle moves backward while passing through R1, with P2 set to the position where YP2=0 is established, with use of the second parking trajectory setting unit 51*b* thereof. FIG. 33 illustrates an example in which the trajectory from P3 to P2 acquired in step S30 passes through inside R1 similarly to FIG. 30, and, in this case, the trajectory is acquired as illustrated in FIG. 34 if the parking trajectory setting unit 51 acquires the trajectory from P3 to P2 when the vehicle moves backward until being positioned in parallel with the parking end position P0 after passing through R1 in step S43. In FIG. 34, the Y coordinate of P2 is 0>YP2≥−Wp, and, in this case, the lateral position (the position in the Y axis direction) is offset when the vehicle is positioned in parallel with the parking end position P0. When the vehicle has moved backward as far as this position, the vehicle should be repositioned sideways to reach the parking end position after that, which leads to an increase in the number of times that the running direction is switched, and thus an increase in the movement distance. Therefore, the parking trajectory setting unit 51 acquires the trajectory from P3 to P2, with P2 set to the position where the Y coordinate of P2 reaches YP2=0 while the vehicle is moving backward, similarly to step S38. FIG. 35 illustrates an example of the acquired trajectory.

Figure 36:
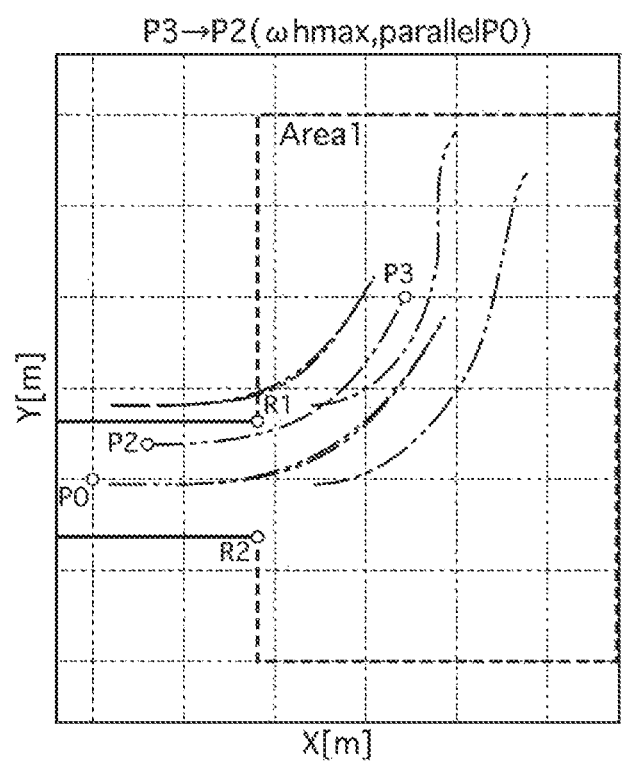
FIG. 36 illustrates an example that acquires the trajectory from P3 to P2 when the vehicle moves backward until being positioned in parallel with the parking end position P0 at the maximum steering angle and the maximum steering angular speed.
Figure 37:
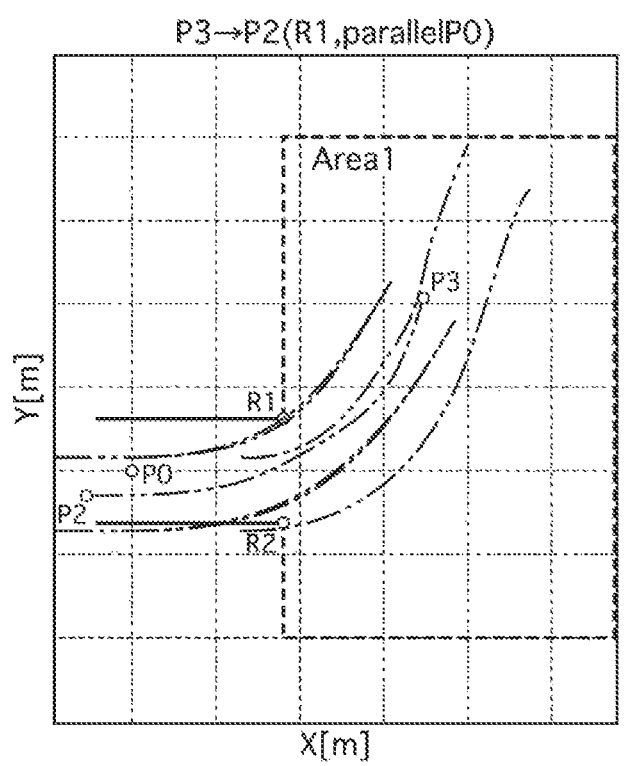
FIG. 37 illustrates an example that acquires the trajectory from P3 to P2 when the vehicle moves backward until being positioned in parallel with the parking end position P0 after passing through R1.
Figure 38:
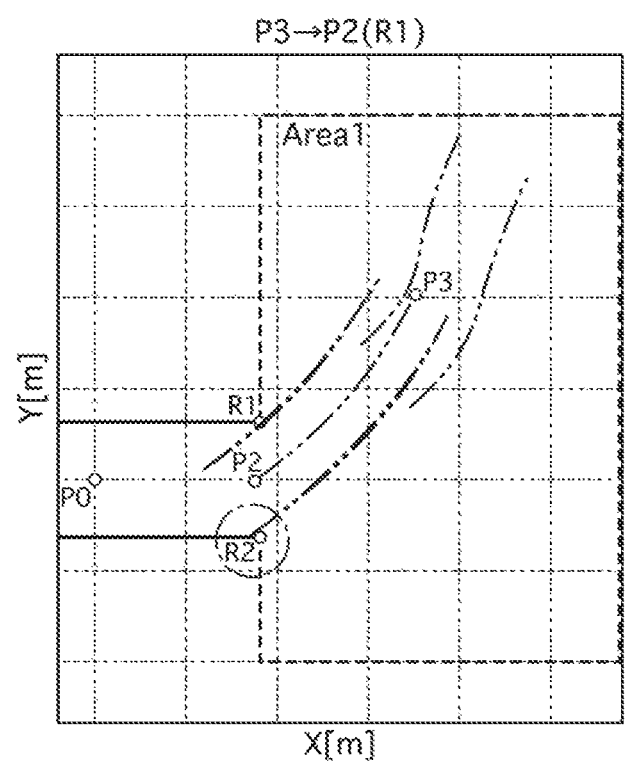
FIG. 38 illustrates an example that acquires the trajectory from P3 to P2 when the vehicle moves backward until contacting the straight line L5 after passing through R1.
Figure 39:
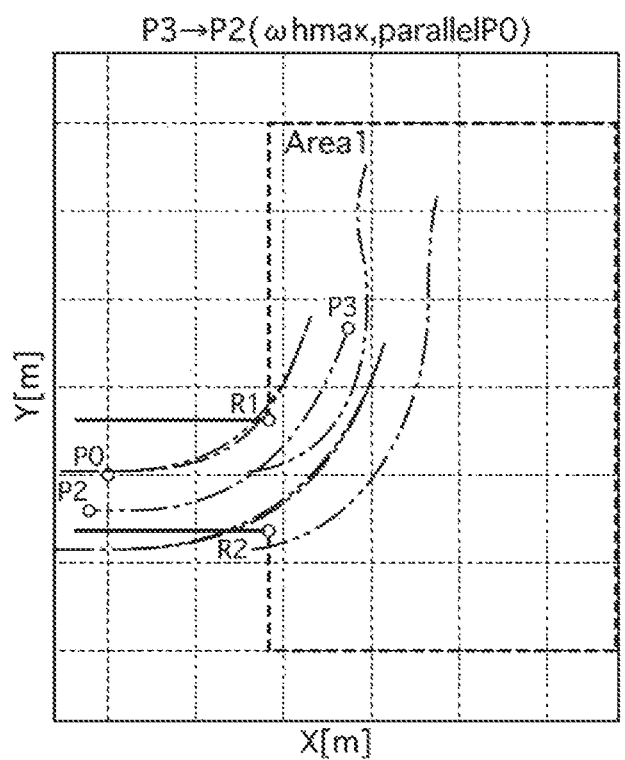
FIG. 39 illustrates an example that acquires the trajectory from P3 to P2 when the vehicle moves backward until being positioned in parallel with the parking end position P0 at the maximum steering angle and the maximum steering angular speed.
Figure 40:
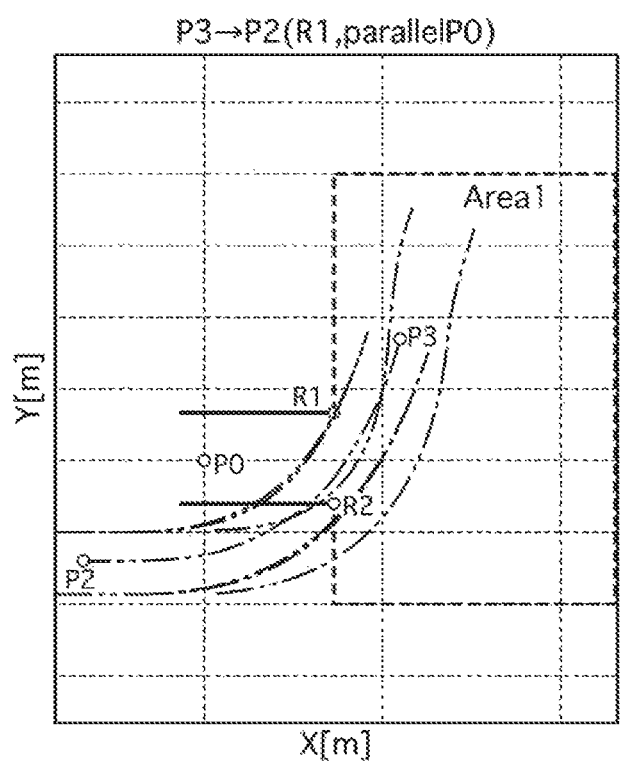
FIG. 40 illustrates an example that acquires the trajectory from P3 to P2 when the vehicle moves backward until being positioned in parallel with the parking end position P0 after passing through R1.
Figure 41:
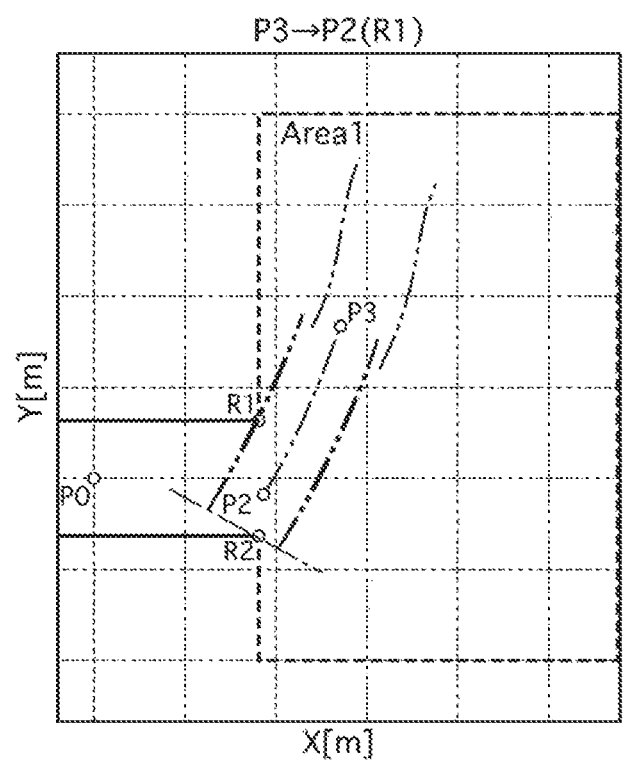
FIG. 41 illustrates an example that acquires the trajectory from P3 to P2 when the vehicle moves backward until contacting R2 after passing through R1.

In step S51, the parking trajectory setting unit 51 acquires the trajectory from P3 to P2 when the vehicle moves backward while passing through R1, with use of the first parking trajectory setting unit 51*a* thereof. FIG. 36 also illustrates an example in which the trajectory from P3 to P2 acquired in step S30 passes through inside R1 similarly to FIGS. 30 and 33, and, in this case, the trajectory is acquired as illustrated in FIG. 37 if the parking trajectory setting unit 51 acquires the trajectory from P3 to P2 when the vehicle moves backward until being positioned in parallel with the parking end position P0 after passing through R1 in step S43. In FIG. 37, the Y coordinate of P2 is YP2<−Wp, so that the parking trajectory setting unit 51 acquires the trajectory from P3 to P2 in which the vehicle passes through R1. FIG. 38 illustrates a result of acquiring the trajectory. In FIG. 38, the rear right end of the vehicle is in contact with the straight line L5 illustrated in FIG. 11 at P2. FIG. 39 also illustrates an example in which the trajectory from P3 to P2 acquired in step S30 passes through inside R1 similarly to FIGS. 30, 33, and 36, and, in this case, the trajectory is acquired as illustrated in FIG. 40 if the parking trajectory setting unit 51 acquires the trajectory from P3 to P2 when the vehicle moves backward until being positioned in parallel with the parking end position P0 after passing through R1 in step S43. In FIG. 40, the Y coordinate of P2 is YP2<−Wp, and the parking trajectory setting unit 51 acquires the trajectory from P3 to P2 in which the vehicle passes through R1 in step S51. FIG. 41 illustrates a result of acquiring the trajectory. In FIG. 41, the rear edge of the vehicle is in contact with R2 at P2.

Figure 14:
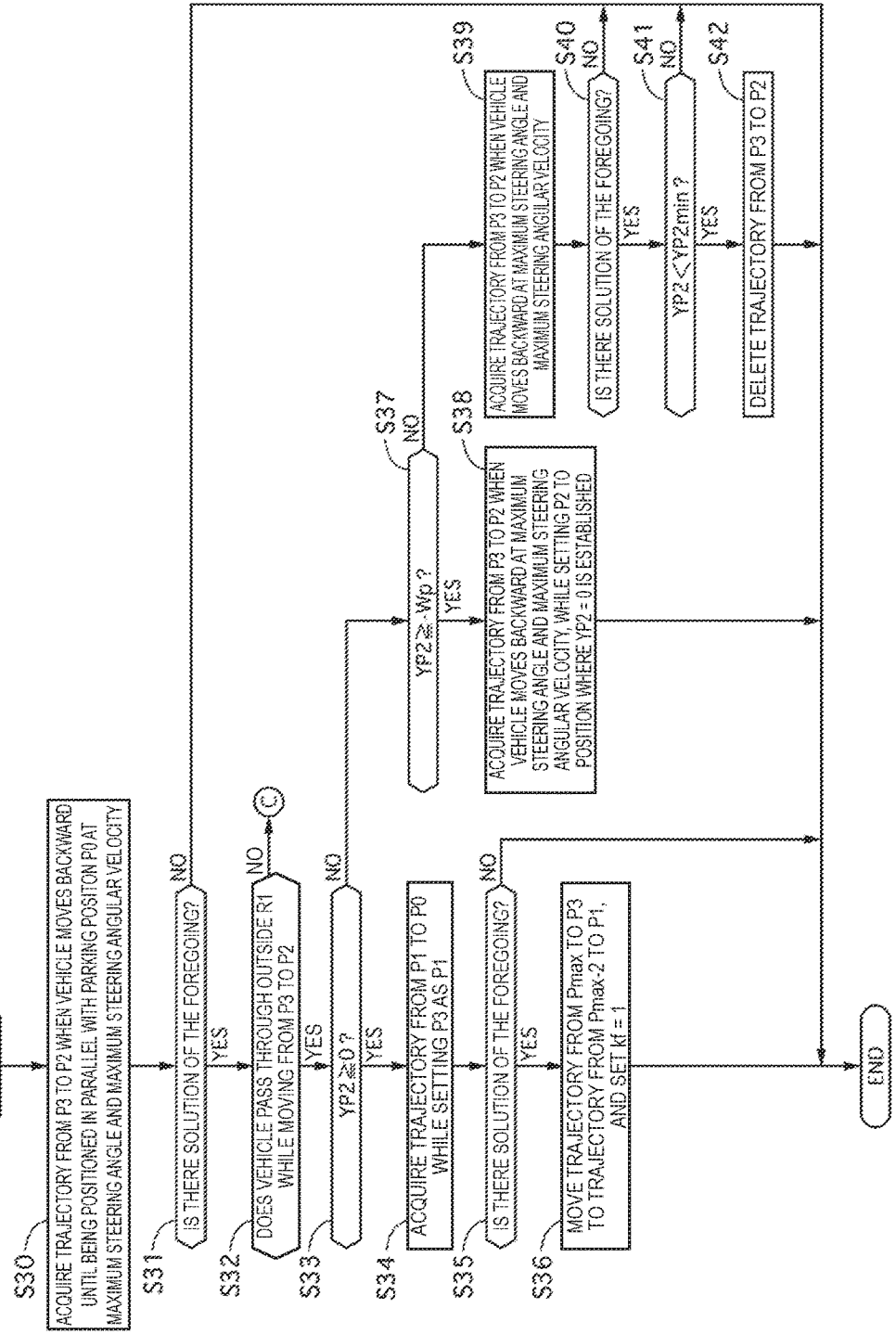
FIG. 14 is a flowchart illustrating a procedure for calculating a trajectory from P3 to P2.
Figure 15:
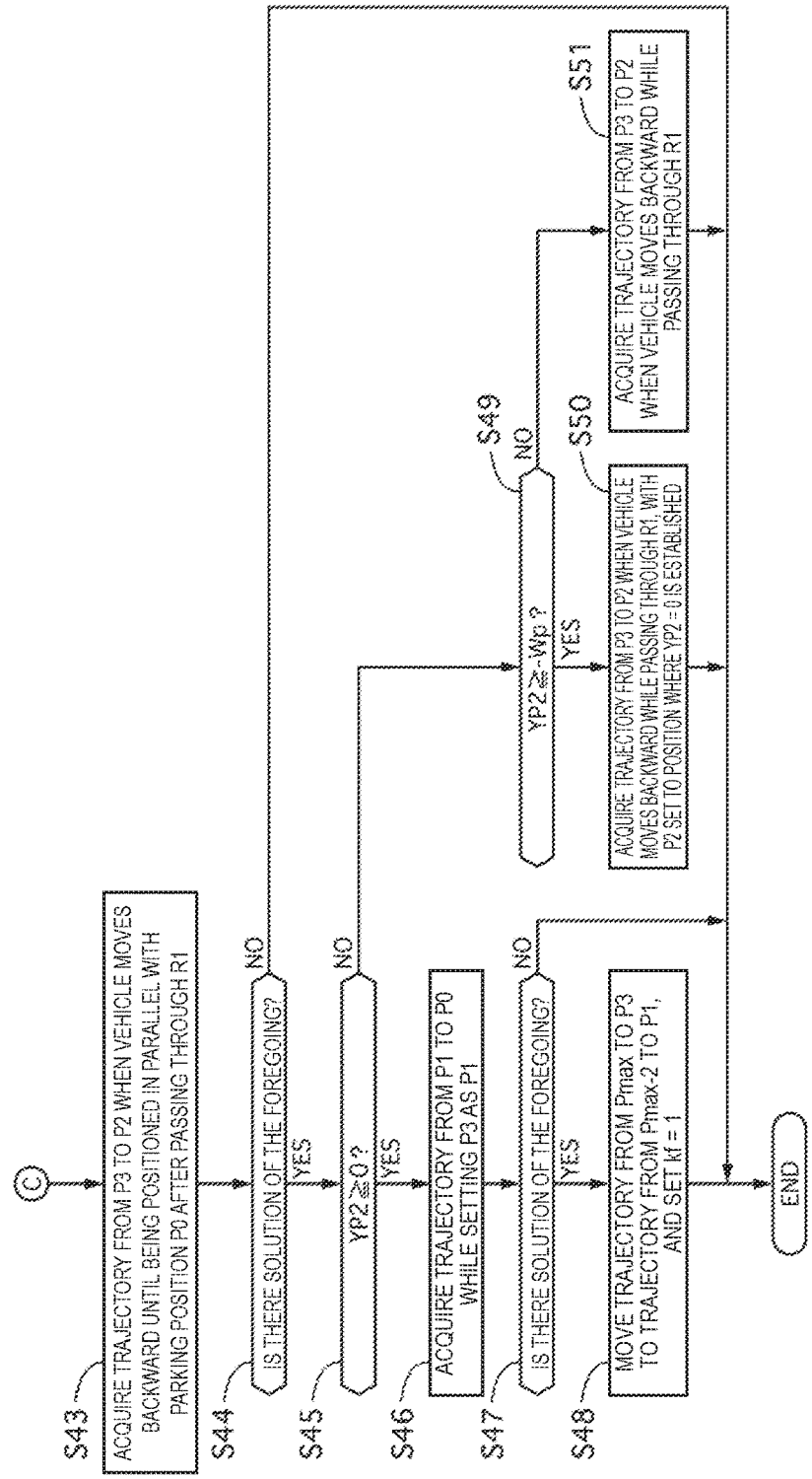
FIG. 15 is a flowchart illustrating the procedure for calculating the trajectory from P3 to P2.

This is the procedure for acquiring the trajectory from P3 to p2 in steps S4 and S19 illustrated in FIGS. 12 and 13 according to the flowcharts illustrated in FIGS. 14 and 15.

Figure 42:
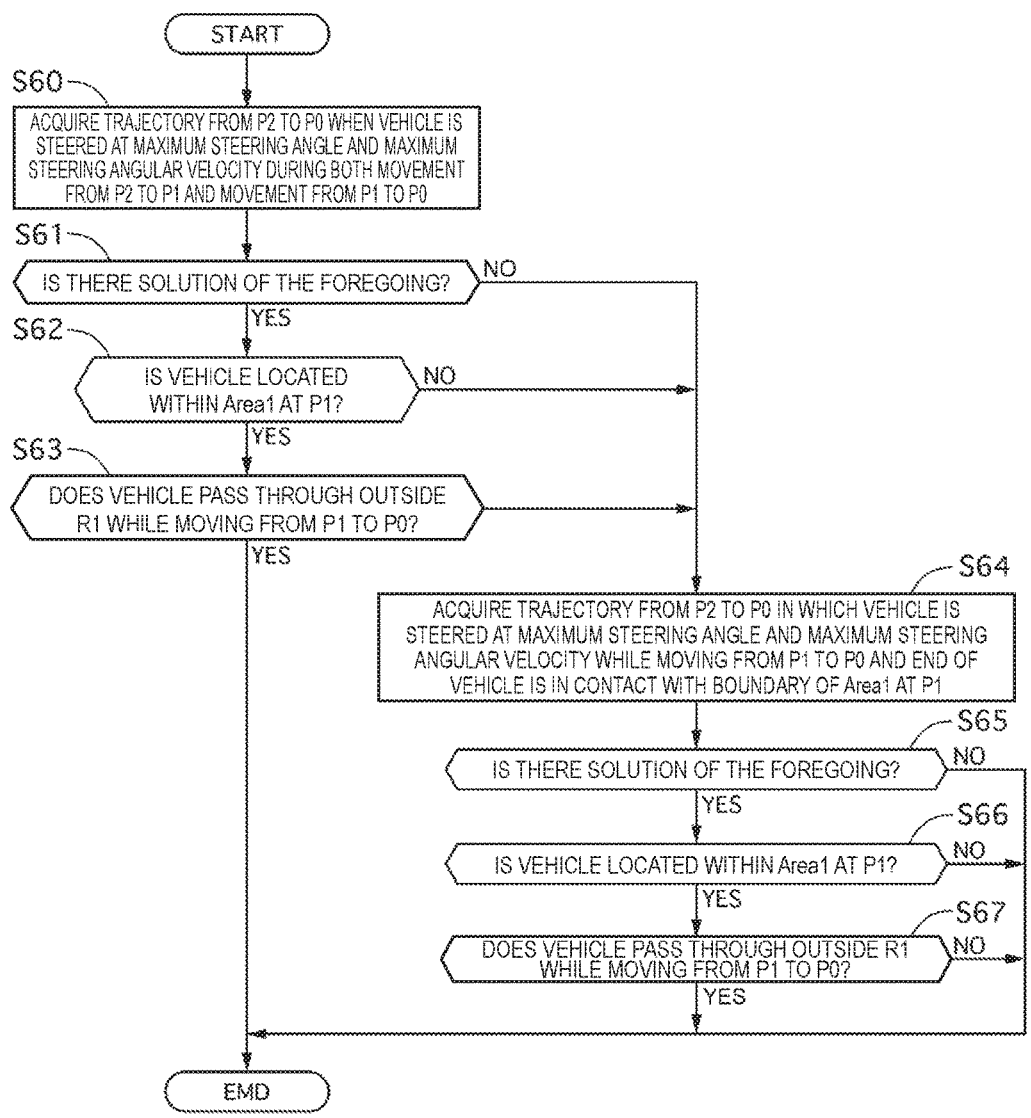
FIG. 42 is a flowchart for acquiring a trajectory from P2 to P0.

Next, the procedure for acquiring the trajectory from P2 to P0 in step S7 in the flowchart illustrated in FIG. 12 will be described with reference to a flowchart illustrated in FIG. 42. The position of P0 is set to an arbitrary point to which P0 is displaced from the original parking end position to the positive side on the X axis, and an amount of the displacement of P0 is assumed to be ds, similarly to steps S34 and S46 illustrated in FIGS. 14 and 15, and FIGS. 17 and 32. When the amount ds is ds>0, the vehicle can reach the parking end position by moving backward straight by the distance as long as ds after the running direction is repeatedly switched from the parking start position Pmax to P0.

Figure 43:
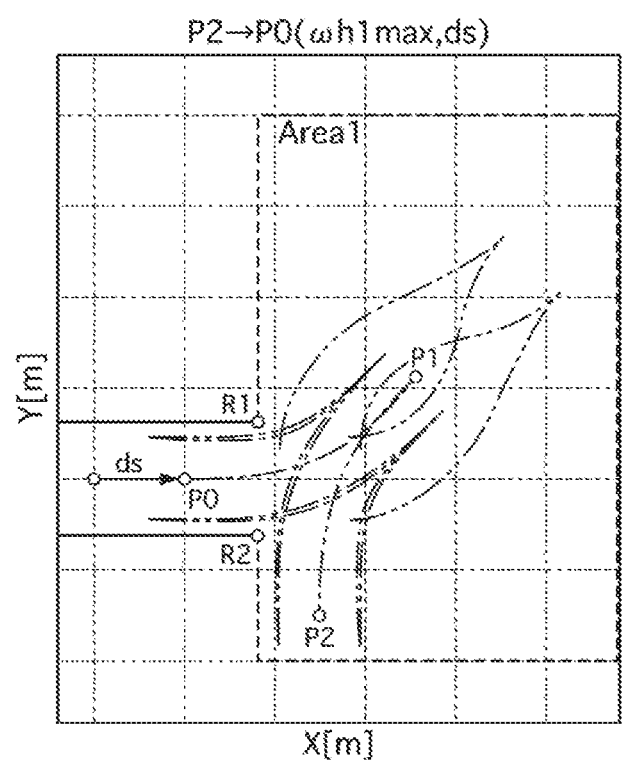
FIG. 43 is an example that acquires the trajectory from P2 to P0.

In step S60, the parking trajectory setting unit 51 calculates the trajectory when the vehicle is steered at the maximum steering angle and the maximum steering angular velocity during both the movement from P2 to P1 and the movement from P1 to P0. FIG. 43 illustrates an example of the acquired trajectory.

If there is a solution from step S60 in step S61, the flow proceeds to step S62. If there is no solution from step S60 in step S61, the flow proceeds to step S64.

If the vehicle is located inside Area1 at P1 in the trajectory acquired in step S60 in step S62, the flow proceeds to step S63. If the vehicle is located beyond Area1 in step S62, the flow proceeds to step S64.

If the vehicle passes through outside R1 while moving from P1 to P0 in step S63, the acquired trajectory is set as a solution for the trajectory from P2 to P0 and the processing is ended. If the vehicle passes through inside R1, the flow proceeds to step S64. In the example illustrated in FIG. 43, the vehicle is located inside Area1 at P1, and the vehicle passes through outside R1 while moving from P1 to P0, so that the acquired trajectory is set as the solution for the trajectory from P2 to P0.

Figure 44:
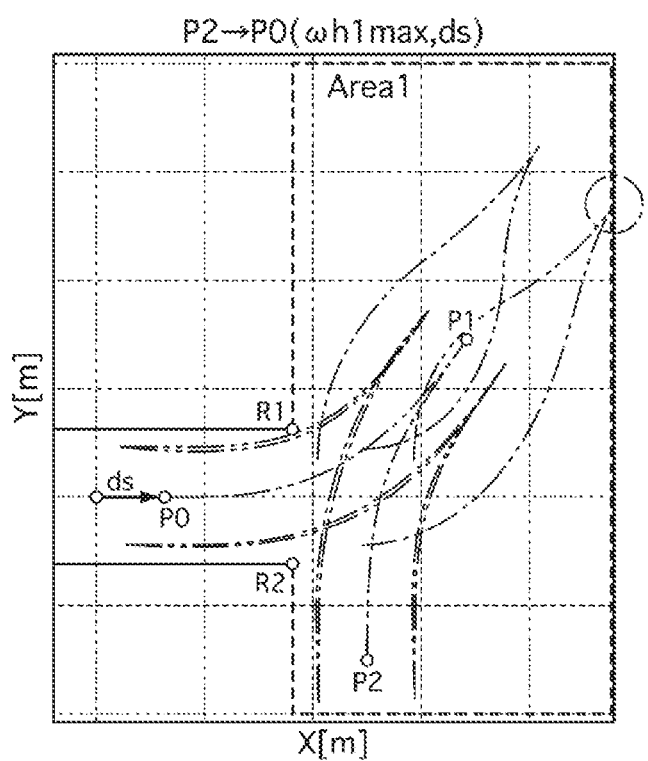
FIG. 44 is an example that acquires the trajectory from P2 to P0.

In step S64, the parking trajectory setting unit 51 acquires the trajectory from P2 to P0 in which the vehicle is steered at the maximum steering angle and the maximum steering angular velocity while moving from P1 to P0, and the end of the vehicle is in contact with the boundary of Area1 at P1. FIG. 44 illustrates an example of the acquired trajectory, and the front right end of the vehicle is in contact with the straight line L2 illustrated in FIG. 11 at P1.

If there is a solution from step S64 in step S65, the flow proceeds to step S66. If there is no solution from step S64 in step S65, the processing is ended.

If the vehicle is located inside Area1 at P1 in the trajectory acquired in step S64 in step S66, the flow proceeds to step S67. If the vehicle is located beyond Area1 in step S66, the processing is ended while it is determined that no solution is acquired for the trajectory from P2 to P0.

If the vehicle passes through outside R1 while moving from P1 to P0 in step S67, the acquired trajectory is set as the solution for the trajectory from P2 to P0 and the processing is ended. If the vehicle passes through inside R1 in step S67, the processing is ended while it is determined that no solution is acquired for the trajectory from P2 to P0.

Figure 45:
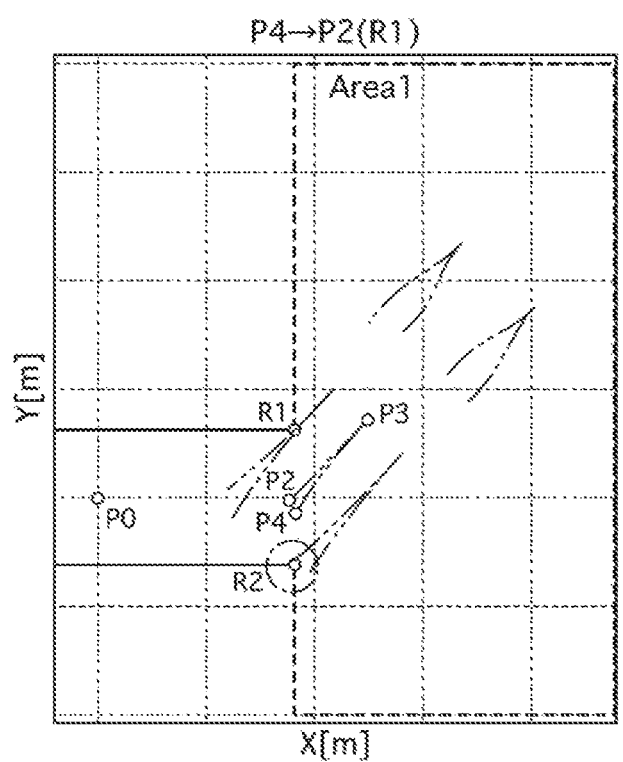
FIG. 45 is an example that acquires a trajectory in which the vehicle moves from P4 to P2 while passing through R1.
Figure 46:
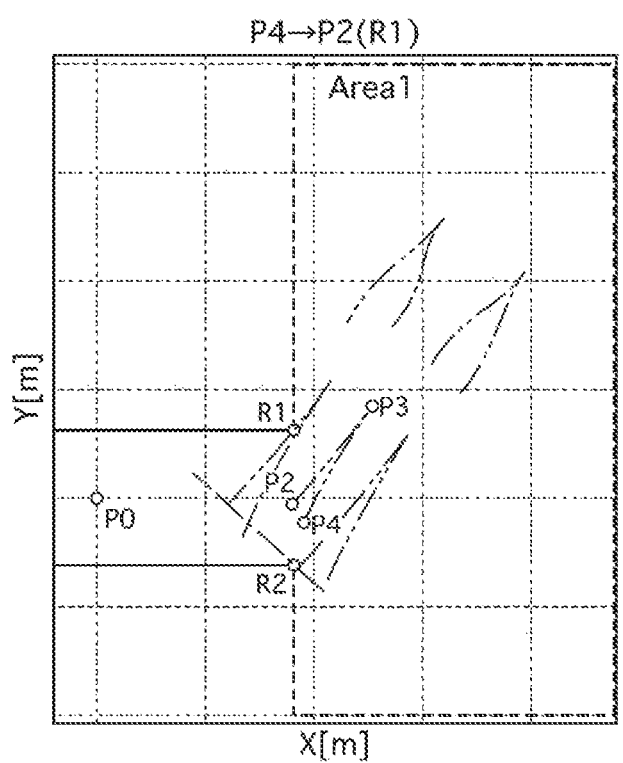
FIG. 46 is an example that acquires the trajectory in which the vehicle moves from P4 to P2 while passing through R1.
Figure 47:
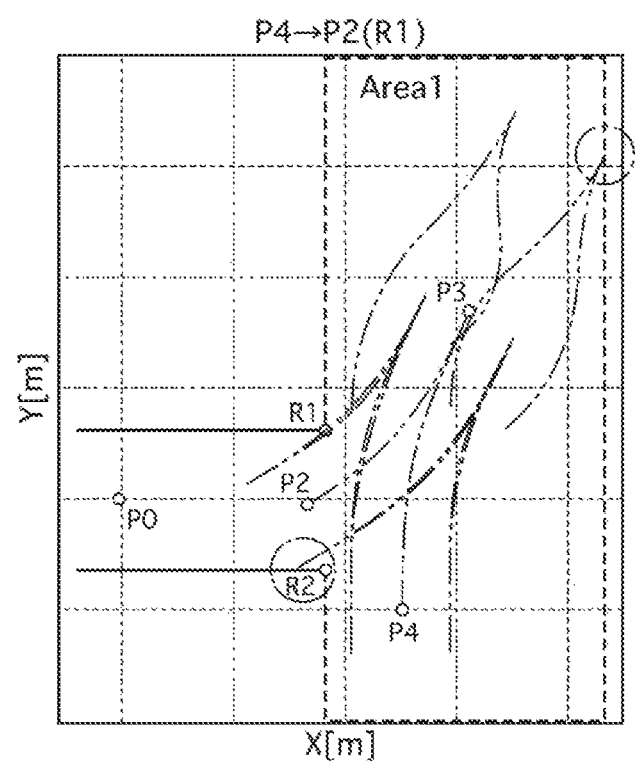
FIG. 47 is an example that acquires the trajectory in which the vehicle moves from P4 to P2 while passing through R1.
Figure 48:
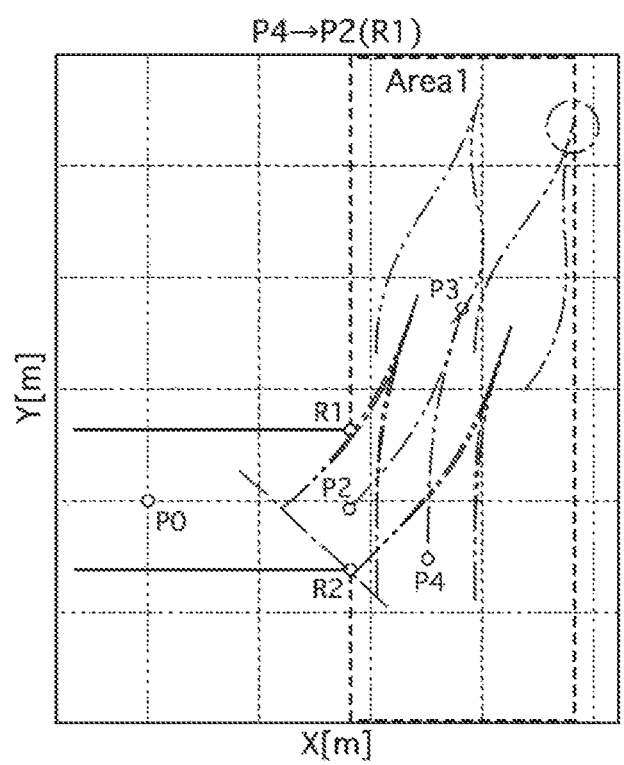
FIG. 48 is an example that acquires the trajectory in which the vehicle moves from P4 to P2 while passing through R1.

Next, the processing for acquiring the trajectory from P4 to P2 in which the vehicle passes through R1 in step S12 in the flowchart illustrated in FIG. 13 will be described. FIG. 45 illustrates an example of the acquired trajectory, and this trajectory is generated in such a manner that the vehicle is steered at the maximum steering angle and the maximum steering angular velocity during both the movement from P4 to P3 and the movement from P3 to P2, and the rear right end of the vehicle is in contact with the straight line L5 illustrated in FIG. 11 at P2. FIG. 46 also illustrates an example of the acquired trajectory, and this trajectory is generated in such a manner that the vehicle is steered at the maximum steering angle and the maximum steering angular velocity during both the movement from P4 to P3 and the movement from P3 to P2, and the rear edge surface of the vehicle is in contact with R2 at P2. FIG. 47 also illustrates an example of the acquired trajectory, in which the vehicle is steered at the maximum steering angle and the maximum steering angular velocity while moving from P3 to P2, and the front right end and the rear right end of the vehicle are in contact with the straight line L2 and the straight line L5 illustrated in FIG. 11 at P3 and P2, respectively. FIG. 48 also illustrates an example of the acquired trajectory, in which the vehicle is steered at the maximum steering angle and the maximum steering angular velocity while moving from P3 to P2, and the front right end and the rear edge surface of the vehicle are in contact with the straight line L2 and R2 illustrated in FIG. 11 at P3 and P2, respectively. After acquiring the trajectory from P4 to P2 in which the vehicle passes through R1 in step S12, the parking trajectory setting unit 51 determines whether there is a solution in step S13, and this determination also includes a determination about whether the trajectory can be contained inside Area1 illustrated in FIG. 11.

Figure 49:
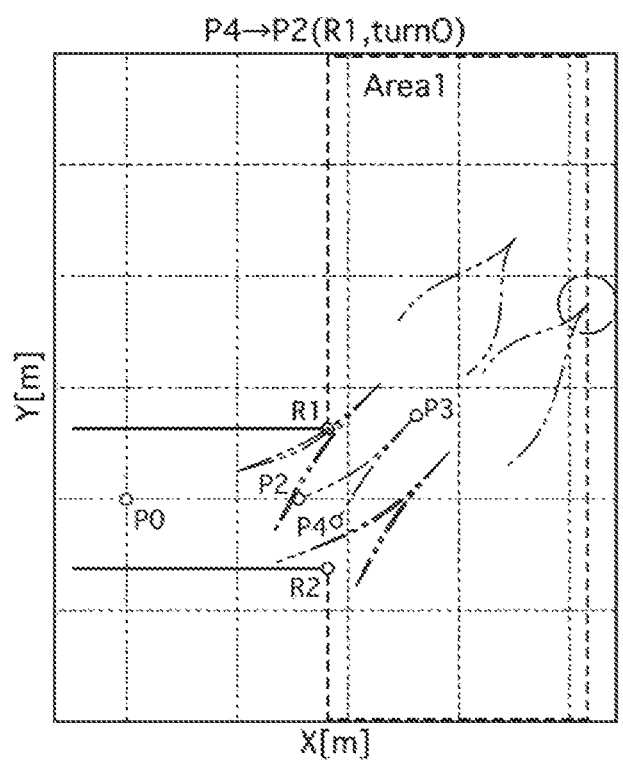
FIG. 49 is an example that acquires the trajectory in which the vehicle moves from P4 to P2 while passing through R1, with YP2 set to YP2=0.

Next, the processing for acquiring the trajectory from P4 to P2 in which the vehicle passes through R1 while setting the Y coordinate of P2 to YP2=0 in step S14 in the flowchart illustrated in FIG. 13 will be described. FIG. 49 illustrates an example of the acquired trajectory. If the vehicle further moves backward from P2 illustrated in FIG. 49, the lateral position is offset when the vehicle is positioned in parallel with the parking end position. When the vehicle has moved backward as far as this position, the vehicle should be repositioned sideways to reach the parking end position after that, which leads to an increase in the number of times that the running direction is switched, and thus an increase in the movement distance. Therefore, in step S12, the parking trajectory setting unit 51 acquires a solution that causes the vehicle to contact any of the straight lines L1, L4, and L5 illustrated in FIG. 11 at P2, with use of the first parking trajectory setting unit 51a thereof. If there is not such a solution, the flow proceeds to step S14, in which the parking trajectory setting unit 51 acquires a solution while determining the running direction switching position with the Y coordinate of P2 set to YP2=0, with use of the second parking trajectory setting unit 51b thereof. In step S14, similarly to step S12, the parking trajectory setting unit 51 also acquires the trajectory under both a condition that the vehicle is steered at the maximum steering angle and the maximum steering angular velocity during both the movement from P4 to P3 and the movement from P3 to P2, and a condition that the vehicle is steered at the maximum steering angle and the maximum steering angular velocity while moving from P3 to P2 and the front right end of the vehicle is in contact with the straight line L2 illustrated in FIG. 11 at P3.

Figure 50:
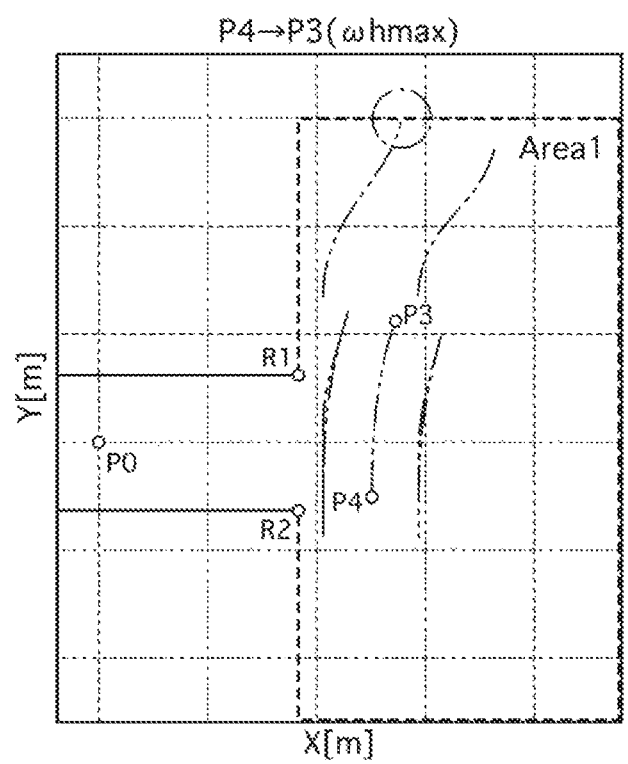
FIG. 50 illustrates an example that acquires a trajectory from P4 to P3 at the maximum steering angle and the maximum steering angular speed.
Figure 51:
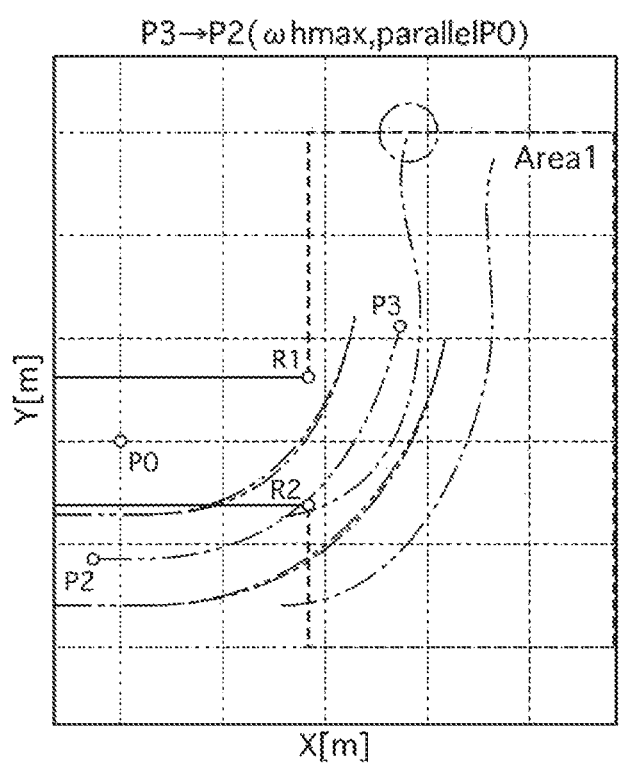
FIG. 51 illustrates an example that acquires the trajectory from P3 to P2 when the vehicle moves backward until being positioned in parallel with the parking end position P0 at the maximum steering angle and the maximum steering angular speed.
Figure 52:
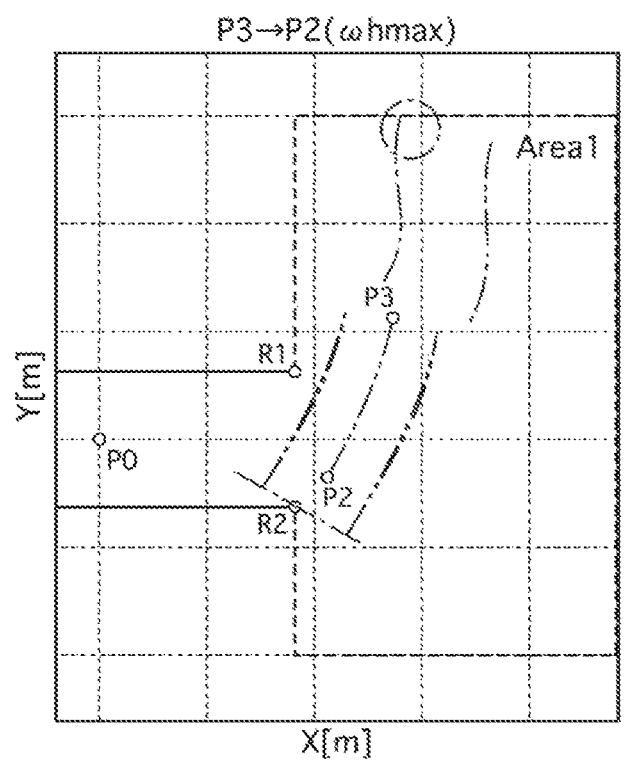
FIG. 52 illustrates an example that acquires the trajectory from P3 to P2 at the maximum steering angle and the maximum steering angular speed.
Figure 53:
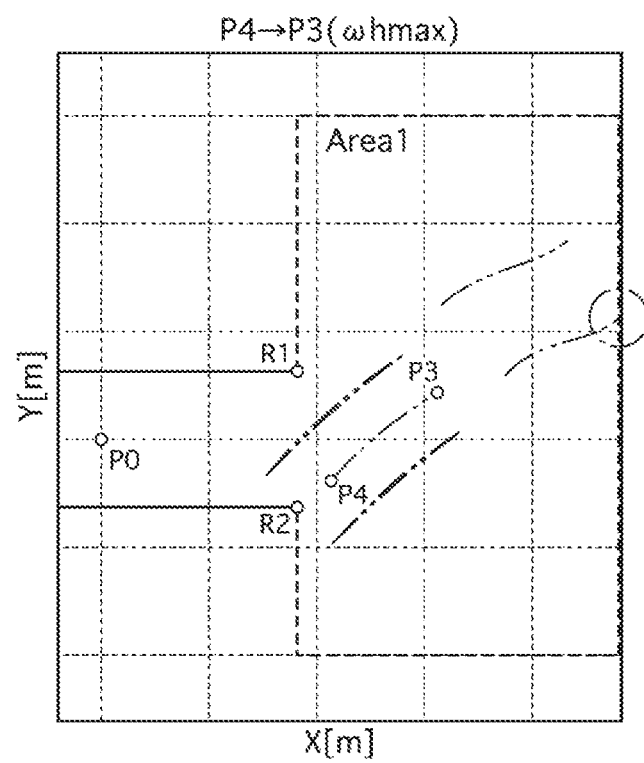
FIG. 53 illustrates an example that acquires the trajectory from P4 to P3 at the maximum steering angle and the maximum steering angular speed.
Figure 54:
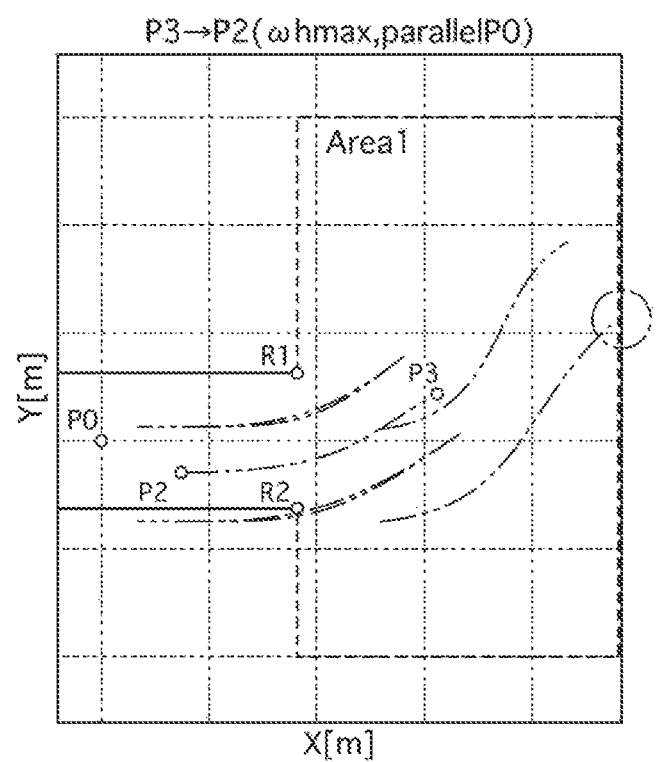
FIG. 54 illustrates an example that acquires the trajectory from P3 to P2 when the vehicle moves backward until being positioned in parallel with the parking end position P0 at the maximum steering angle and the maximum steering angular speed.
Figure 55:
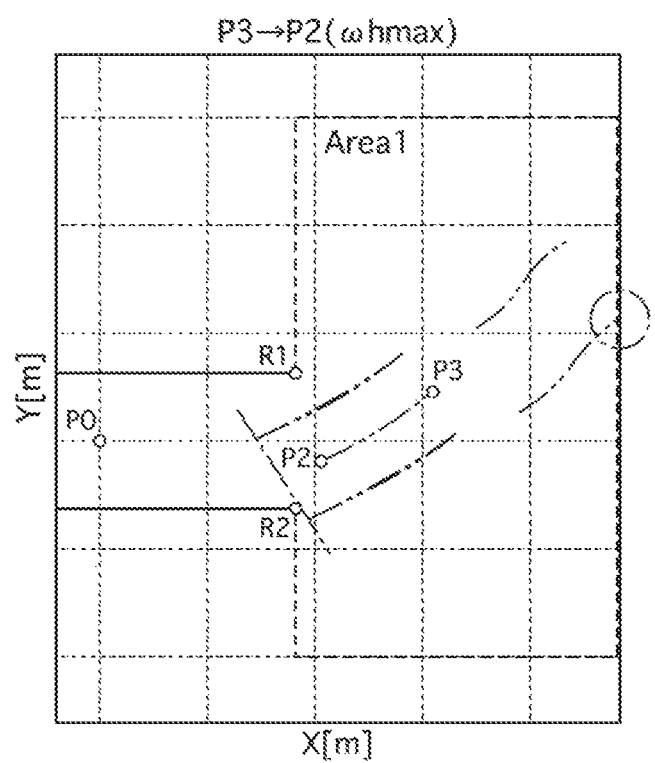
FIG. 55 illustrates an example that acquires the trajectory from P3 to P2 at the maximum steering angle and the maximum steering angular speed.

Next, the processing for acquiring the trajectory from P4 to P3 in which the vehicle is steered at the maximum steering angle and the maximum steering angular velocity in step S17 in the flowchart illustrated in FIG. 13 will be described. FIG. 50 illustrates an example of the acquired trajectory, and this trajectory is generated in such a manner that the vehicle is steered at the maximum steering angle and the maximum steering angular velocity while moving from P4 to P3, and the front left end of the vehicle is in contact with the straight line L3 illustrated in FIG. 11 at P3. FIG. 51 illustrates a result of acquiring the trajectory from P3 to p2 when the vehicle moves backward until being positioned in parallel with the parking end position P0 from P3 at the maximum steering angle and the maximum steering angular velocity in step S30 according to the flowcharts illustrated in FIGS. 14 and 15 that are performed in step S19 after acquiring the trajectory illustrated in FIG. 50 in step S17. Then, FIG. 52 illustrates a result of acquiring the trajectory from P3 to P2 in step S39. In FIG. 52, the rear edge surface of the vehicle is in contact with R2 at P2. In this manner, the vehicle passes through outside R1 and cannot pass through R1 even according to the trajectory in which the vehicle is steered at the maximum steering angle and the maximum steering angular velocity during both the movement from P4 to P3 and the movement from P3 to P2, so that the solution cannot be acquired in steps S12 and S14. In such a case, the parking trajectory setting unit 51 acquires the trajectory from P4 to P2 in which the vehicle is steered at the maximum steering angle and the maximum steering angular velocity in the processing procedures in steps S17 and S19. Further, FIG. 53 also illustrates an example that acquires the trajectory from P4 to P3 in which the vehicle is steered at the maximum steering angle and the maximum steering angular velocity in step S17. In FIG. 53, the trajectory is generated in such a manner that the front right end of the vehicle is in contact with the straight line L2 illustrated in FIG. 11 at P3. FIG. 54 illustrates a result of acquiring the trajectory from P3 to P2 when the vehicle moves backward from P3 until being positioned in parallel with the parking end position P0 at the maximum steering angle and the maximum steering angular velocity in step S30 according to the flowcharts illustrated in FIGS. 14 and 15 that are performed in step S19 after that. FIG. 55 illustrates a result of acquiring the trajectory from P3 to P2 in step S39. In FIG. 55, the rear edge surface of the vehicle is in contact with R2 at P2.

Next, functions will be described.

The conventional parking trajectory calculation apparatus detects the positions of the obstacles on the left and right sides of the vehicle during the forward movement for the perpendicular parking, and sets the parking trajectory so as to prevent the vehicle from contacting the adjacent vehicles on the left and right sides of the parking end position and the obstacle on the opposite side from the parking end position during the backward movement.

However, the above-described conventional technique has the following problems.

1. The conventional technique functions in such a manner that the driver first drives forward the vehicle and the parking trajectory is acquired as the parking trajectory starting from the backward movement after that, thereby failing to support the parking trajectory including the first forward movement, ending up imposing the limitation on the parking start position.

2. The conventional technique fails to support the trajectory when the running direction is switched on a further back side with respect to the boundary with one of the adjacent parking frames that is located behind the vehicle at the time of the first backward movement.

3. The conventional technique fails to clearly specify the method for generating the parking trajectory when the running direction is repeatedly switched after the vehicle moves backward for the first time.

4. The conventional technique repositions the vehicle sideways if the lateral position is offset after the running direction is repeatedly switched until the vehicle is positioned in parallel with the parking end position P0, which results in an increase in the number of times that the running direction is switched and thus an increase in the movement distance.

On the other hand, in the first embodiment, the parking trajectory setting unit 51 first calculates the trajectory from P1 to P0 in which the vehicle moves from the parking start position P2 to the parking end position P0 through a single backward movement (a first parking trajectory) (steps S34 and S46). If the trajectory from P1 to P0 cannot be calculated, the parking trajectory setting unit 51 calculates the parking trajectory from P2 to P0 in which the vehicle moves backward after moving forward (a second parking trajectory) (step S7). If the parking trajectory P2 to P0 cannot be calculated, the parking trajectory setting unit 51 sequentially increases the number of times that the running direction is switched. This configuration allows the parking assist apparatus to support the parking trajectory in which the vehicle first moves forward, thereby allowing the parking assist apparatus to calculate the parking trajectory from the arbitrary parking start position P2. Further, if being able to calculate the parking trajectory from P1 to P0 in which the vehicle moves from the parking start position P2 to the parking end position P0 through only a single backward movement, the parking trajectory setting unit 51 employs this trajectory, which can prevent or cut down the increase in the number of times that the running direction is switched and thus the increase in the movement distance, due to an unnecessary forward or backward movement.

The parking trajectory setting unit 51 switches the parking trajectory to the parking trajectory in which the vehicle moves forward from P3 if the vehicle position YP2 in the Y axis direction after the backward movement is smaller than the lower limit value YP2 min when the parking trajectory setting unit 51 acquires the parking trajectory from P3 to P2 in which the vehicle moves backward after moving forward (step S42). The rear portion of the vehicle should be approaching the entrance of the parking frame PA1 while the running direction is repeatedly switched, to allow the vehicle to be parked at the parking end position P0 with a small number of times that the running direction is switched and a short movement distance. Therefore, if the parking trajectory from P3 to P2 is calculated in such a manner that the rear portion of the vehicle is distanced away from the entrance of the parking frame PA1, the parking trajectory setting unit 51 calculates the parking trajectory in which the vehicle moves forward from P3 without employing this parking trajectory, and therefore can acquire the parking trajectory with a small number of times that the running direction is switched and a short movement distance.

The parking trajectory setting unit 51 acquires the parking trajectory for the perpendicular parking of the subject vehicle at the parking end position P0 in the limited area Area1 (FIG. 11) defined by combining the parking area PA1 of the subject vehicle and the area limited by the obstacle and the like (the region surrounded by the straight lines L1, L2, L3, and L4). Setting the T-shaped limited area Area1 allows the parking assist apparatus to make the best use of the movable range of the subject vehicle, thereby allowing the parking assist apparatus to calculate the parking trajectory in which the vehicle moves backward after moving forward. Therefore, the parking assist apparatus can calculate the parking trajectory in which the vehicle moves from the arbitrary parking start position P2 with a small number of times that the running direction is switched and a short movement distance.

If the Y coordinate YP2 of P2 when the vehicle moves backward from P3 until being positioned in parallel with the P0 is smaller than −Wp, i.e., if the distance between P2 and the parking end position P0 in the Y axis direction is longer than the distance Wp from the right surface of the vehicle when the subject vehicle is parked at the center of the parking frame PA1 (assuming that the parking space is located on the left side of the subject vehicle in the traveling direction) to the parking frame PA1, the parking trajectory setting unit 51 calculates the trajectory from P3 to P2 while setting the running direction switching point to the point where the subject vehicle is in contact with any of the virtual lines L1, L4, and L5 surrounding the limited area Area1 (steps S39 and S51). Calculating the parking trajectory while setting the running direction switching point to any of the virtual lines L1, L4, and L5 allows the parking assist apparatus to make the best use of the limited area Area1 to calculate the parking trajectory with a small number of times that the running direction is switched and a short movement distance.

On the other hand, if the Y coordinate YP2 of P2 when the vehicle moves backward from P3 until being positioned in parallel with P0 is −Wp or larger, i.e., if the distance between P2 and the parking end position P0 in the Y axis direction is shorter than the distance Wp from the right surface of the vehicle when the subject vehicle is parked at the center of the parking frame PA1 to the parking frame PA1, the parking trajectory setting unit 51 calculates the parking trajectory from P3 to P2 while setting P2 to the position where YP2=0 is established (the position where the Y coordinate coincides with the Y coordinate of the parking end position P0) (steps S38 and S50). If the Y coordinate of P2 is YP2≥−Wp, the position in the Y axis direction is offset when the subject vehicle is positioned in parallel with the parking end position P0. When having moved backward as far as this position, the subject vehicle should be repositioned sideways to reach the parking end position P0 after that. Repositioning the vehicle sideways leads to an increase in the number of times that the running direction is switched, and thus an increase in the movement distance. Therefore, if the Y coordinate of P2 is YP2≥−Wp, the parking trajectory setting unit 51 acquires the trajectory from P3 to P2 while setting P2 to the position where YP=0 is established, and therefore can calculate the parking trajectory with a small number of times that the running direction is switched and a short movement distance.

The parking trajectory setting unit 51 calculates the parking trajectory with use of the maximum steering angle if using the circular arc as the trajectory, and with use of the maximum steering angle and the maximum steering angular velocity if using the clothoid curve as the trajectory (steps S17, S38, S39, and S60). The use of the maximum steering angle and the maximum steering angular velocity allows the parking assist apparatus to calculate the shortest parking trajectory.

If being able to select only one of the condition that the vehicle is steered at the maximum steering angle and the maximum steering angular velocity, and the condition that the running direction is switched when the vehicle is in contact with any of the virtual lines L1, L2, L3, and L4 surrounding the limited area Area1 when calculating the parking trajectory, the parking trajectory setting unit 51 prioritizes the condition that the vehicle is steered at the maximum steering angle and the maximum steering angular velocity (steps S60 and S64). The parking trajectory is minimized when being calculated with use of the maximum steering angle and the maximum steering angular velocity, so that the shortest parking trajectory can be calculated.

If the vehicle can reach the parking end position P0 through only a backward movement realizable by a small steering amount, the maximum steering angle and the maximum steering angular velocity do not have to be calculated, and calculating the maximum steering angle and the maximum steering angular velocity in this case may prevent the vehicle from reaching the parking end position P0, increasing the number of times that the running direction is switched. Therefore, in this case, the parking trajectory setting unit 51 calculates the parking trajectory at a smaller steering angle and a lower steering angular velocity than the maximum steering angle and the maximum steering angular velocity, respectively (steps S34 and S46).

Further, when the subject vehicle passes through inside the point R1 if using the maximum steering angle and the maximum steering angular velocity while moving backward, the parking trajectory setting unit 51 also calculates the parking trajectory at a smaller steering angle and a lower steering angular velocity than the maximum steering angle and the maximum steering angular velocity, respectively velocity, respectively (steps S50 and S51).

Further, when the subject vehicle moves beyond the limited area Area1 from the virtual line 2 if using the maximum steering angle and the maximum steering angular velocity while moving forward, the parking trajectory setting unit 51 also calculates the parking trajectory at a smaller steering angle and a lower steering angular velocity than the maximum steering angle and the maximum steering angular velocity, respectively (steps S12, S14, and S64).

Other Embodiments

Having described the embodiment for embodying the present invention based on the example thereof, the specific configuration of the present invention is not limited to the configuration described in the exemplary embodiment, and the present invention also includes a design modification and the like thereof made within a range that does not depart from the spirit of the present invention.

For example, in the first embodiment, the calculation of the parking trajectory has been described referring to the method for calculating the perpendicular parking trajectory, but even a parallel parking trajectory can be calculated similarly to the first embodiment.

Figure 56:
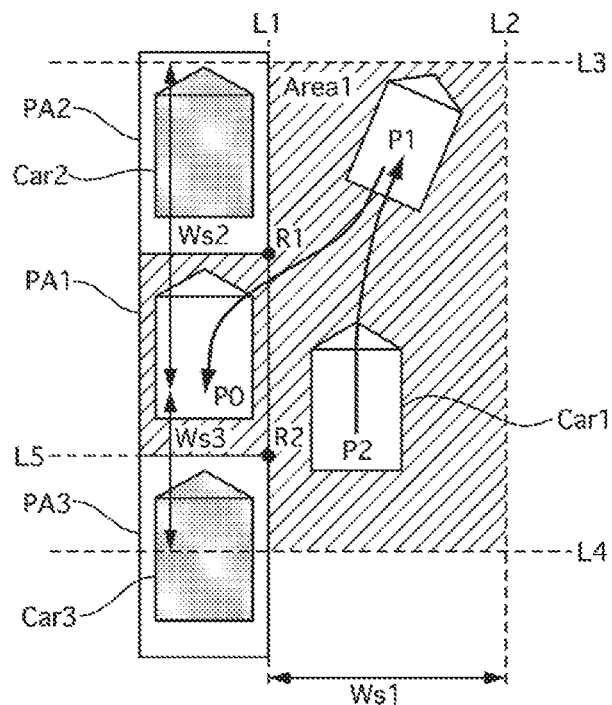
FIG. 56 illustrates a condition for acquiring a trajectory for parallel parking.

FIG. 56 illustrates a condition for acquiring the trajectory of the parallel parking, and the parallel parking trajectory can be calculated by setting a similar limited area Area1 to FIG. 11 and following the procedure illustrated in FIG. 12.

In the following description, some of technical ideas included in the present invention will be described.

(a) A parking trajectory calculation apparatus includes a recognition unit configured to recognize a parking space for parking a subject vehicle in a limited area preset based on a result of recognition of an obstacle, and a parking trajectory calculation unit configured to calculate a parking trajectory for guiding the subject vehicle from an arbitrary parking start position to a parking end position in the recognized parking space while avoiding the obstacle. The parking trajectory calculation unit calculates the parking trajectory in which the vehicle moves backward after moving forward if being unable to calculate the parking trajectory for guiding the vehicle to the parking space through a backward movement.

(b) In the parking trajectory calculation apparatus according to (a), the recognition unit recognizes, based on the result of the recognition of the obstacle, the preset limited area where the subject vehicle is movable and the parking space serving as a parking end position for perpendicular parking of the subject vehicle in the limited area. The parking trajectory calculation unit calculates the parking trajectory in such a manner that the vehicle is steered rightward when moving forward and is steered leftward when moving backward if the parking space is located on a left side of the subject vehicle in a travelling direction, and calculates the parking trajectory in such a manner that the vehicle is steered leftward when moving forward and is steered rightward when moving backward if the parking space is located on a right side of the subject vehicle in a travelling direction. If being able to acquire a backward trajectory for guiding the subject vehicle from the parking start position to the recognized parking space through the backward movement without use of the forward movement, the parking trajectory calculation unit sets the backward trajectory from the parking start position as the parking trajectory, and, if being unable to acquire the backward trajectory, the parking trajectory calculation unit calculates a forward and backward trajectory from the parking start position as the parking trajectory. The parking trajectory calculation unit calculates the parking trajectory in such a manner that the vehicle first moves forward, if a position of the vehicle after the backward movement calculated first is located away from the parking end position by a predetermined distance or longer in a Y axis direction, assuming that the Y axis direction is a lateral direction of the vehicle at the parking end position.

(c) The parking trajectory calculation apparatus according to (a) further includes a limited area setting unit configured to set, as the limited area, a limited area defined by surrounding the parking space for parking the subject vehicle, an area in front of the parking space, and areas on left and right sides of the parking space in the area in front of the parking space with a virtual line. The parking trajectory calculation unit calculates the parking trajectory for perpendicular parking of the subject vehicle at the parking end position in the limited area based on the virtual line.

(d) In the parking trajectory calculation apparatus according to (c), the parking trajectory calculation unit includes a first parking trajectory calculation unit configured to calculate a trajectory while setting a running direction switching point to a point where the subject vehicle is in contact with the virtual line when the subject vehicle moves based on the calculated trajectory, and a second parking trajectory calculation unit configured to calculate, as the running direction switching point, a point before the subject vehicle is in contact with the virtual line when the subject vehicle moves based on the calculated trajectory when a relationship between the subject vehicle and the virtual line satisfies a predetermined condition. The parking trajectory calculation unit calculates a point on an X axis as the running direction switching point with use of the second parking trajectory calculation unit, if a position of the vehicle is offset from the parking end position in a direction of a Y axis when the vehicle moves backward until being positioned in parallel with the parking end position, assuming that the X axis and the Y axis are virtual axes extending in a longitudinal direction and a lateral direction of the vehicle when the vehicle is parked at the parking end position, respectively.

(e) In the parking trajectory calculation apparatus according to (d), the parking trajectory calculation unit includes a third parking trajectory calculation unit configured to calculate the parking trajectory with use of a maximum steering angle of a steering apparatus mounted on the vehicle if a circular arc is used as the trajectory, and calculate the parking trajectory with use of the maximum steering angle and a maximum steering angular velocity of the steering apparatus if a clothoid curve is used as the trajectory.

(f) In the parking trajectory calculation apparatus according to (e), the parking trajectory calculation unit calculates the parking trajectory with use of a result of the calculation of the third parking trajectory calculation unit if being able to select only one of the parking trajectories of the first parking trajectory calculation unit and the third parking trajectory calculation unit.

(g) In the parking trajectory calculation apparatus according to (e), the parking trajectory calculation unit calculates the parking trajectory with a steering angle or a steering angular velocity smaller or lower than the preset maximum steering angle or the preset maximum steering angular velocity of the steering apparatus, when calculating the parking trajectory that allows the vehicle to be parked at the parking end position with a predetermined or smaller steering amount.

(h) In the parking trajectory calculation apparatus according to (e), the parking trajectory calculation unit calculates the parking trajectory with a steering angle or a steering angular velocity smaller or lower than the preset maximum steering angle or the preset maximum steering angular velocity of the steering apparatus, when calculating the trajectory in such a manner that an inner wheel passes through inside an end in front of the parking space when the vehicle moves backward.

(i) In the parking trajectory calculation apparatus according to (e), the parking trajectory calculation unit calculates the parking trajectory in such a manner that the vehicle is steered rightward when moving forward and is steered leftward when moving backward if the parking space is located on a left side of the subject vehicle in a traveling direction, and calculates the parking trajectory in such a manner that the vehicle is steered leftward when moving forward and is steered rightward when moving backward if the parking space is located on a right side of the subject vehicle in the traveling direction. The parking trajectory calculation unit calculates the parking trajectory with a steering angle or a steering angular velocity smaller or lower than the preset maximum steering angle or the preset maximum steering angular velocity of the steering apparatus, if the parking space is located on the left side of the subject vehicle in the traveling direction and the vehicle moves beyond a right-side boundary of the limited area when moving forward, or if the calculated parking space is located on the right side of the subject vehicle in the traveling direction and the vehicle moves beyond a left-side boundary of the limited area when moving forward.

(j) A parking trajectory calculation apparatus includes a limited area setting unit configured to set a preset limited area based on a result of recognition of an obstacle, a recognition unit configured to recognize a parking space for perpendicular parking of a subject vehicle, and a parking trajectory calculation unit configured to calculate a parking trajectory for guiding the subject vehicle from an arbitrary parking start position set by a driver to a parking end position set in the parking space. The parking trajectory calculation unit includes a first trajectory calculation unit configured to calculate a backward trajectory for guiding the subject vehicle to the parking space through a single backward movement while avoiding the obstacle, and a second trajectory calculation unit configured to calculate a backward trajectory for guiding the subject vehicle to the parking space by causing the subject vehicle to move backward after moving forward if the trajectory cannot be calculated by the first trajectory calculation unit.

(k) In the parking trajectory calculation apparatus according to (j), the parking trajectory calculation unit calculates the parking trajectory in such a manner that the subject vehicle moves forward and backward while being steered leftward and rightward, and calculates the parking trajectory according to a steering amount, a steering angle, and a steering angular velocity corresponding to a predetermined condition preset regarding the leftward and rightward steering.

(l) In the parking trajectory calculation apparatus according to (k), the parking trajectory calculation unit includes a third parking trajectory calculation unit configured to calculate the parking trajectory with use of a maximum steering angle of a steering apparatus mounted on the vehicle if a circular arc is used as the trajectory, and calculate the parking trajectory with use of the maximum steering angle and a maximum steering angular velocity of the steering apparatus if a clothoid curve is used as the trajectory.

Therefore, a shortest parking trajectory can be calculated.

(m) In the parking trajectory calculation apparatus according to (l), the parking trajectory calculation unit calculates the parking trajectory with a steering angle or a steering angular velocity smaller or lower than the preset maximum steering angle or the preset maximum steering angular velocity of the steering apparatus, when calculating the parking trajectory that allows the vehicle to be parked at the parking end position with a predetermined or smaller steering amount.

(n) In the parking trajectory calculation apparatus according to (m), the parking trajectory calculation unit calculates the parking trajectory with a steering angle or a steering angular velocity smaller or lower than the preset maximum steering angle or the preset maximum steering angular velocity of the steering apparatus, when calculating the trajectory in such a manner that an inner wheel passes through inside an end in front of the parking space when the vehicle moves backward.

(o) In the parking trajectory calculation apparatus according to (n), the parking trajectory calculation unit calculates the parking trajectory in such a manner that the vehicle is steered rightward when moving forward and is steered leftward when moving backward if the parking space is located on a left side of the subject vehicle in a traveling direction, and calculates the parking trajectory in such a manner that the vehicle is steered leftward when moving forward and is steered rightward when moving backward if the parking space is located on a right side of the subject vehicle in the traveling direction. The parking trajectory calculation unit calculates the parking trajectory with a steering angle or a steering angular velocity smaller or lower than the preset maximum steering angle or the preset maximum steering angular velocity of the steering apparatus, if the parking space is located on the left side of the subject vehicle in the traveling direction and the vehicle moves beyond a right-side boundary of the limited area when moving forward, or if the calculated parking space is located on the right side of the subject vehicle in the traveling direction and the vehicle moves beyond a left-side boundary of the limited area when moving forward.

(p) In the parking trajectory calculation apparatus according to (j), the parking trajectory calculation unit calculates the parking trajectory in such a manner that the vehicle is steered rightward when moving forward and is steered leftward when moving backward if the parking space is located on a left side of the subject vehicle in a traveling direction, and calculates the parking trajectory in such a manner that the vehicle is steered leftward when moving forward and is steered rightward when moving backward if the parking space is located on a right side of the subject vehicle in the traveling direction. If being able to acquire the backward trajectory for guiding the subject vehicle from the parking start position to the recognized parking space through the backward movement without use of the forward movement, the parking trajectory calculation unit sets the backward trajectory as the parking trajectory, and, if being unable to acquire the backward trajectory, the parking trajectory calculation unit calculates the forward and backward trajectory from the parking start position as the parking trajectory. The parking trajectory calculation unit calculates the parking trajectory in such a manner that the vehicle first moves forward, if a position of the vehicle after the backward movement calculated first is located away from the parking end position by a predetermined distance or longer in a Y axis direction, assuming that the Y axis direction is a lateral direction of the vehicle at the parking end position.

Therefore, the parking trajectory can be calculated in such a manner that the vehicle can be parked with a smaller number of times that the running direction is switched and a shorter movement distance.

(q) In the parking trajectory calculation apparatus according to (p), the parking trajectory calculation unit calculates the parking trajectory with a steering angle or a steering angular velocity smaller or lower than the preset maximum steering angle or the preset maximum steering angular velocity of the steering apparatus, when calculating the parking trajectory that allows the vehicle to be parked at the parking end position with a predetermined or smaller steering amount.

(r) In the parking trajectory calculation apparatus according to (q), wherein the parking trajectory calculation unit calculates the parking trajectory with a steering angle or a steering angular velocity smaller or lower than the preset maximum steering angle or the preset maximum steering angular velocity of the steering apparatus, when calculating the trajectory in such a manner that an inner wheel passes through inside an end in front of the parking space when the vehicle moves backward.

(s) In the parking trajectory calculation apparatus according to (r), the parking trajectory calculation unit calculates the parking trajectory in such a manner that the vehicle is steered rightward when moving forward and is steered leftward when moving backward if the parking space is located on the left side of the subject vehicle in the traveling direction, and calculates the parking trajectory in such a manner that the vehicle is steered leftward when moving forward and is steered rightward when moving backward if the parking space is located on the right side of the subject vehicle in the traveling direction. The parking trajectory calculation unit calculates the parking trajectory with a steering angle or a steering angular velocity smaller or lower than the preset maximum steering angle or the preset maximum steering angular velocity of the steering apparatus, if the parking space is located on the left side of the subject vehicle when in the traveling direction and the vehicle moves beyond a right-side boundary of the limited area when moving forward, or if the calculated parking space is located on the right side of the subject vehicle in the traveling direction and the vehicle moves beyond a left-side boundary of the limited area when moving forward.

(t) A parking trajectory calculation method includes recognizing a parking space for parking a subject vehicle in a preset limited area, calculating a first parking trajectory for guiding the subject vehicle from an arbitrary parking start position to the parking space by causing the subject vehicle to first move backward, calculating a second parking trajectory by causing the subject vehicle to move backward after moving forward if the first parking trajectory cannot be calculated, and ending the calculation of the parking trajectory if the second parking trajectory cannot be calculated.

Therefore, according to the above-described embodiments, the parking trajectory from the arbitrary parking start position can be calculated Having described merely several embodiments of the present invention, it is apparent to those skilled in the art that the embodiments described as examples can be modified or improved in various manners without substantially departing from the novel teachings and advantages of the present invention. Therefore, such embodiments modified or improved in various manners are intended to be also contained in the technical scope of the present invention.

Having described the embodiments of the present invention based on several examples thereof, the above-described embodiments of the present invention are intended to only facilitate the understanding of the present invention, and are not intended to limit the present invention thereto. Needless to say, the present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority to Japanese Patent Application No. 2014-134374 filed on Jun. 30, 2014. The entire disclosure of Japanese Patent Application No. 2014-134374 filed on Jun. 30, 2014 including the specification, the claims, the drawings, and the summary is incorporated herein by reference in its entirety.

The entire disclosure of Japanese Patent Application Public Disclosure No. 2009-298179 (PTL 1) including the specification, the claims, the drawings, and the summary is incorporated herein by reference in its entirety.

REFERENCE SIGNS LIST 50 parking position recognition unit (recognition unit)
50a limited area setting unit
51 parking trajectory setting unit (parking trajectory calculation unit)
51a first parking trajectory setting unit (first parking trajectory calculation unit)
51b second parking trajectory setting unit (second parking trajectory calculation unit)
51c third parking trajectory setting unit (third parking trajectory calculation unit)
S7 second trajectory calculation unit
S34, S46 first trajectory calculation unit

The invention claimed is:
1. A parking trajectory calculation apparatus comprising:
at least one electronic control unit configured to:
recognize a parking space for parking a subject vehicle in a preset limited area based on a result of recognition of an obstacle;
attempt to calculate a first parking trajectory for guiding the subject vehicle through a backward movement from an arbitrary parking start position to a parking end position in the recognized parking space while avoiding the obstacle;
calculate a second parking trajectory in which the subject vehicle moves backward after moving forward to the parking end position in the recognized parking space while avoiding the obstacle when the first parking trajectory for guiding the subject vehicle to the parking space through only a backward movement does not exist;
wherein the preset limited area consists of the parking space for parking the subject vehicle, a first area which is located in front of the parking space in a longitudinal direction of the parking space and is located within a first distance of the parking space in the longitudinal direction, a second area which is located adjacent to the first area on one side in a perpendicular direction perpendicular to the longitudinal direction and is located within a second distance from the first area in the perpendicular direction, and a third area which is located adjacent to the first area on opposite side in the perpendicular direction and is located within a third distance from the first area in the perpendicular direction;
wherein the first and/or second parking trajectory for parking of the subject vehicle at the parking end position in the preset limited area is based on a virtual line bounding the preset limited area;
wherein the first and/or second parking trajectory is calculated in such a manner that:
(a) requires setting a running direction switching point to a point where the subject vehicle is in contact with the virtual line when the subject vehicle moves based on the calculated first parking trajectory, or setting the running direction switching point as a point before the subject vehicle is in contact with the virtual line when the subject vehicle moves based on the calculated second parking trajectory, when a relationship between the subject vehicle and the virtual line satisfies a predetermined condition,
(b) a point on an X axis is calculated as the running direction switching point during the second parking trajectory calculation when a position of the subject vehicle is offset from the parking end position in a direction of a Y axis when the subject vehicle moves backward until being positioned in parallel with the parking end position, assuming that the X axis and the Y axis are virtual axes extending in a longitudinal direction and a lateral direction of the subject vehicle when the subject vehicle is parked at the parking end position, respectively, and
(c) requires calculating a maximum steering angle of a steering apparatus mounted on the subject vehicle when a circular arc is used within the first and/or second parking trajectory, and/or calculating the maximum steering angle and a maximum steering angular velocity of the steering apparatus when a clothoid curve is used within the first and/or second parking trajectory; and
wherein the calculated first or second parking trajectory is used to park the subject vehicle at the end position.
2. The parking trajectory calculation apparatus according to claim 1, wherein the at least one electronic control unit is further configured to:
recognize, based on the result of the recognition of the obstacle, the preset limited area where the subject vehicle is movable and the parking space which is to be the parking end position for perpendicular parking of the subject vehicle in the recognized parking space while avoiding the obstacle;

calculate the second parking trajectory in such a manner that the subject vehicle is steered rightward when moving forward and is steered leftward when moving backward when the parking space is located on a left side of the subject vehicle in a traveling direction;

calculate the second parking trajectory in such a manner that the subject vehicle is steered leftward when moving forward and is steered rightward when moving backward when the parking space is located on a right side of the subject vehicle in the traveling direction;

utilize the first parking trajectory if when able to acquire a backward-only trajectory for guiding the subject vehicle from the parking start position to the recognized parking space through backward-only movement without use of forward movement;

utilize the second parking trajectory from the parking start position when being unable to acquire the first parking trajectory; and calculate the second parking trajectory in such a manner that the subject vehicle first moves forward when a predicted parking end position of the subject vehicle after simulating execution of the first parking trajectory while avoiding the obstacle is located away from the parking end position in the recognized parking space by a predetermined distance or longer in a Y axis direction, assuming that the Y axis direction is a lateral direction of the subject vehicle at the parking end position.

3. The parking trajectory calculation apparatus according to claim 1, wherein the at least one electronic control unit is further configured to:

calculate the first and/or second parking trajectory utilizing a steering angle and/or a steering angular velocity smaller or lower than the maximum steering angle and/or the maximum steering angular velocity of the steering apparatus when it enables the subject vehicle to be parked at the parking end position in the recognized parking space while avoiding the obstacle.

4. The parking trajectory calculation apparatus according to claim 1, wherein the at least one electronic control unit is further configured to:

calculate the first and/or second parking trajectory utilizing a steering angle and/or a steering angular velocity smaller or lower than the maximum steering angle or the maximum steering angular velocity of the steering apparatus when it enables an inner wheel of the subject vehicle to pass inside an end of an area immediately in front of the parking space when the subject vehicle moves backward while avoiding the obstacle.

5. The parking trajectory calculation apparatus according to claim 1, wherein the at least one electronic control unit is further configured to:

calculate the first and/or second parking trajectory in such a manner that the subject vehicle is steered rightward when moving forward and is steered leftward when moving backward when the parking space is located on a left side of the subject vehicle in a traveling direction;

calculate the first and/or second parking trajectory in such a manner that the subject vehicle is steered leftward when moving forward and is steered rightward when moving backward when the parking space is located on a right side of the subject vehicle in the traveling direction; and calculate the second parking trajectory utilizing a steering angle and/or a steering angular velocity smaller or lower than the maximum steering angle and/or the maximum steering angular velocity of the steering apparatus, when the parking space is located on the left side of the subject vehicle in the traveling direction and the subject vehicle moves beyond a right-side boundary of the preset limited area when moving forward while avoiding the obstacle, or when the calculated parking space is located on the right side of the subject vehicle in the traveling direction and the subject vehicle moves beyond a left-side boundary of the preset limited area when moving forward while avoiding the obstacle.

6. A parking trajectory calculation apparatus comprising:

at least one electronic control unit configured to:

set a preset limited area based on a result of recognition of an obstacle;

recognize a parking space for perpendicular parking of a subject vehicle;

attempt to calculate a first parking trajectory for guiding the subject vehicle through a single backward movement from an arbitrary parking start position set by a driver to a parking end position set in the parking space while avoiding the obstacle;

calculate a second parking trajectory for guiding the subject vehicle to the parking end position set in the parking space while avoiding the obstacle by causing the subject vehicle to move backward after moving forward, when the first parking trajectory does not exist;

wherein the preset limited area consists of the parking space, a first area which is located in front of the parking space in a longitudinal direction of the parking space and is located within a first distance of the parking space in the longitudinal direction, a second area which is located adjacent to the first area on one side in a perpendicular direction perpendicular to the longitudinal direction and is located within a second distance from the first area in the perpendicular direction, and a third area which is located adjacent to the first area on opposite side in the perpendicular direction and is located within a third distance from the first area in the perpendicular direction;

wherein the first and/or second parking trajectory for perpendicular parking of the subject vehicle at the parking end position in the preset limited area is based on a virtual line bounding the preset limited area;

wherein the first and/or second parking trajectory is calculated in such a manner that:

(a) is according to a steering amount, a steering angle, and a steering angular velocity corresponding to a predetermined condition regarding the leftward and rightward steering, (b) utilizes a maximum steering angle of a steering apparatus mounted on the subject vehicle when a circular arc is used within the first and/or second parking trajectory, and/or utilizes the maximum steering angle and a maximum steering angular velocity of the steering apparatus if when a clothoid curve is used within the first and/or second parking trajectory, (c) utilizes a steering angle and/or a steering angular velocity smaller or lower than the maximum steering angle and/or the maximum steering angular velocity of the steering apparatus when it enables the subject vehicle to be parked at the parking end position in the recognized parking space while avoiding the obstacle, and (d) utilizes a steering angle and/or a steering angular velocity smaller or lower than the maximum steering angle and/or the maximum steering angular velocity of the steering apparatus when it enables an inner wheel of the subject vehicle to pass inside an end of an area immediately in front of the parking space when the subject vehicle moves backward while avoiding the obstacle; and wherein the calculated first or second parking trajectory is used to park the subject vehicle at the end position.

7. The parking trajectory calculation apparatus according to claim 6, wherein the at least one electronic control unit is further configured to:

calculate the second parking trajectory in such a manner that the subject vehicle is steered rightward when moving forward and is steered leftward when moving backward when the parking space is located on a left side of the subject vehicle in a traveling direction;

calculate the second parking trajectory in such a manner that the subject vehicle is steered leftward when moving forward and is steered rightward when moving backward when the parking space is located on a right side of the subject vehicle in the traveling direction; and calculate the second parking trajectory utilizing a steering angle and/or a steering angular velocity smaller or lower than the maximum steering angle or the maximum steering angular velocity of the steering apparatus, when the parking space is located on the left side of the subject vehicle in the traveling direction and the subject vehicle moves beyond a right-side boundary of the preset limited area when moving forward while avoiding the obstacle, or when the calculated parking space is located on the right side of the subject vehicle in the traveling direction and the subject vehicle moves beyond a left-side boundary of the preset limited area when moving forward while avoiding the obstacle.

8. The parking trajectory calculation apparatus according to claim 6, wherein the at least one electronic control unit is further configured to:

calculate the second parking trajectory in such a manner that the subject vehicle is steered rightward when moving forward and is steered leftward when moving backward when the parking space is located on a left side of the subject vehicle in a traveling direction;

calculate the second parking trajectory in such a manner that the subject vehicle is steered leftward when moving forward and is steered rightward when moving backward when the parking space is located on a right side of the subject vehicle in the traveling direction;

utilize the first parking trajectory when able to acquire a backward-only trajectory for guiding the subject vehicle from the parking start position to the recognized parking space through backward-only movement without use of forward movement;

utilize the second parking trajectory from the parking start position when being unable to acquire the first parking trajectory; and calculate the second parking trajectory in such a manner that the subject vehicle first moves forward when a predicted parking end position of the subject vehicle after simulating execution of the first parking trajectory while avoiding the obstacle is located away from the parking end position in the recognized parking space by a predetermined distance or longer in a Y axis direction, assuming that the Y axis direction is a lateral direction of the subject vehicle at the parking end position.

9. The parking trajectory calculation apparatus according to claim 8, wherein the at least one electronic control unit is further configured to:

calculate the second parking trajectory utilizing a steering angle and/or a steering angular velocity smaller or lower than the maximum steering angle or the maximum steering angular velocity of the steering apparatus, when the parking space is located on the left side of the subject vehicle in the traveling direction and the subject vehicle moves beyond a right-side boundary of the preset limited area when moving forward while avoiding the obstacle, or when the calculated parking space is located on the right side of the subject vehicle in the traveling direction and the subject vehicle moves beyond a left-side boundary of the preset limited area when moving forward while avoiding the obstacle.

10. A parking trajectory calculation apparatus comprising:

at least one electronic control unit configured to:
set a preset limited area based on a result of recognition of an obstacle;
recognize a parking space for perpendicular parking of a subject vehicle;
attempt to calculate a first parking trajectory for guiding the subject vehicle through a single backward movement from an arbitrary parking start position set by a driver to a parking end position set in the parking space while avoiding the obstacle;
calculate a second parking trajectory for guiding the subject vehicle to the parking end position set in the parking space while avoiding the obstacle by causing the subject vehicle to move backward after moving forward, when the first parking trajectory does not exist;
wherein the preset limited area consists of the parking space, a first area which is located in front of the parking space in a longitudinal direction of the parking space and is located within a first distance of the parking space in the longitudinal direction, a second area which is located adjacent to the first area on one side in a perpendicular direction perpendicular to the longitudinal direction and is located within a second distance from the first area in the perpendicular direction, and a third area which is located adjacent to the first area on opposite side in the perpendicular direction and is located within a third distance from the first area in the perpendicular direction;
wherein the first and/or second parking trajectory for perpendicular parking of the subject vehicle at the parking end position in the preset limited area is based on a virtual line bounding the preset limited area;
wherein the first and/or second parking trajectory is calculated in such a manner that:

(a) the subject vehicle is steered rightward when moving forward and is steered leftward when moving backward when the parking space is located on a left side of the subject vehicle in a traveling direction, (b) the subject vehicle is steered leftward when moving forward and is steered rightward when moving backward when the parking space is located on a right side of the subject vehicle in the traveling direction;

(c) utilizes the first parking trajectory when able to acquire a backward-only trajectory for guiding the subject vehicle from the parking start position to the recognized parking space through backward only movement without use of forward movement, (d) utilizes the second parking trajectory from the parking start position when being unable to acquire the first parking trajectory, (e) the second parking trajectory is calculated in such a manner that the subject vehicle first moves forward when a predicted parking end position of the subject vehicle after simulating execution of the first parking trajectory while avoiding the obstacle is located away from the parking end position in the recognized parking space by a predetermined distance or longer in a Y axis direction, assuming that the Y axis direction is a lateral direction of the subject vehicle at the parking end position, (f) utilizes a steering angle and/or a steering angular velocity smaller or lower than the maximum steering angle and/or the maximum steering angular velocity of the steering apparatus when it enables the subject vehicle to be parked at the parking end position in the recognized parking space while avoiding the obstacle, and (g) utilizes a steering angle and/or a steering angular velocity smaller or lower than the maximum steering angle or the maximum steering angular velocity of the steering apparatus when it enables an inner wheel of the subject vehicle to pass inside an end of an area immediately in front of the parking space when the subject vehicle moves backward while avoiding the obstacle; and wherein the calculated first or second parking trajectory is used to park the subject vehicle at the end position.

* * * * *